United States Patent
Newman

(10) Patent No.: US 11,401,797 B1
(45) Date of Patent: Aug. 2, 2022

(54) ELECTRIC WELL SERVICE RIG FOR ESP INSTALLATIONS

(71) Applicant: Frederic M Newman, Midland, TX (US)

(72) Inventor: Frederic M Newman, Midland, TX (US)

( * ) Notice: Subject to any disclaimer, the term of this patent is extended or adjusted under 35 U.S.C. 154(b) by 0 days.

(21) Appl. No.: 17/698,736

(22) Filed: Mar. 18, 2022

Related U.S. Application Data

(63) Continuation-in-part of application No. 17/497,829, filed on Oct. 8, 2021, now Pat. No. 11,339,612.

(51) Int. Cl.
| | |
|---|---|
| *E21B 43/12* | (2006.01) |
| *E21B 47/008* | (2012.01) |
| *H02K 5/132* | (2006.01) |
| *H02K 7/14* | (2006.01) |
| *E21B 41/00* | (2006.01) |

(52) U.S. Cl.
CPC .......... *E21B 47/008* (2020.05); *E21B 43/127* (2013.01); *E21B 43/128* (2013.01); *H02K 5/132* (2013.01); *H02K 7/14* (2013.01); *E21B 41/0085* (2013.01)

(58) Field of Classification Search
CPC ...... E21B 47/008; E21B 43/12; E21B 43/127; E21B 43/128; E21B 41/0085; E21B 17/02; E21B 15/003; E21B 17/028; E21B 19/16; B66C 23/46; F04B 47/02; H02K 5/132; H02K 7/14
See application file for complete search history.

(56) References Cited

U.S. PATENT DOCUMENTS

| | | |
|---|---|---|
| 6,276,449 B1 | 8/2001 | Newman |
| 6,377,189 B1 | 4/2002 | Newman |
| 7,717,193 B2 | 5/2010 | Egilsson et al. |
| 2002/0153134 A1 | 10/2002 | Newman |
| 2002/0156582 A1 | 10/2002 | Newman |
| 2003/0196798 A1 | 10/2003 | Newman |

(Continued)

OTHER PUBLICATIONS

Oe; NOV Energy Recovery System for Offshore Rigs Gets Corvus ESS; www.oedigital.com/news/483117-nov-energy-recovery-system-for-offshore-rigs-gets-corvus-ess; 4 pages; publication date: Nov. 11, 2020.

(Continued)

*Primary Examiner* — Taras P Bemko
(74) *Attorney, Agent, or Firm* — bobharter.com; Robert J. Harter

(57) ABSTRACT

A mobile service rig includes an onboard rechargeable electric power storage system (e.g., a battery, supercapacitor, etc.) for powering the rig's hoist and drive wheels. Under battery power, the rig travels overland to service wellbores at various wellsites. Once at a wellsite, a submerged pump assembly at the site is de-energized, and the hoist proceeds to remove and reinstall tubing and the pump assembly. While the electric pump assembly is de-energized, the rig's onboard rechargeable electric power storage system taps into the electric power source normally used for the electric pump assembly. The electric power source of the electric pump assembly recharges the rechargeable electric power storage system while the rig is servicing the well. When the hoist lowers the tubing back down into the wellbore, the energy generated by that operation is recovered and used for replenishing the rig's rechargeable electric power storage system.

19 Claims, 20 Drawing Sheets

(56) References Cited

U.S. PATENT DOCUMENTS

| | | |
|---|---|---|
| 2004/0065874 A1 | 4/2004 | Newman |
| 2004/0162658 A1 | 8/2004 | Newman |
| 2005/0103491 A1 | 5/2005 | Newman |
| 2009/0057630 A1 | 3/2009 | Newman |
| 2009/0063054 A1 | 3/2009 | Newman |
| 2013/0276291 A1 | 10/2013 | Huseman |
| 2016/0204719 A1 | 7/2016 | Lesanko |
| 2017/0370358 A1 | 12/2017 | Graybill |

OTHER PUBLICATIONS

Texas Administrative Code, Title 16, Part 1, Ch. 3, Rule 3.37 (Year: 2021).

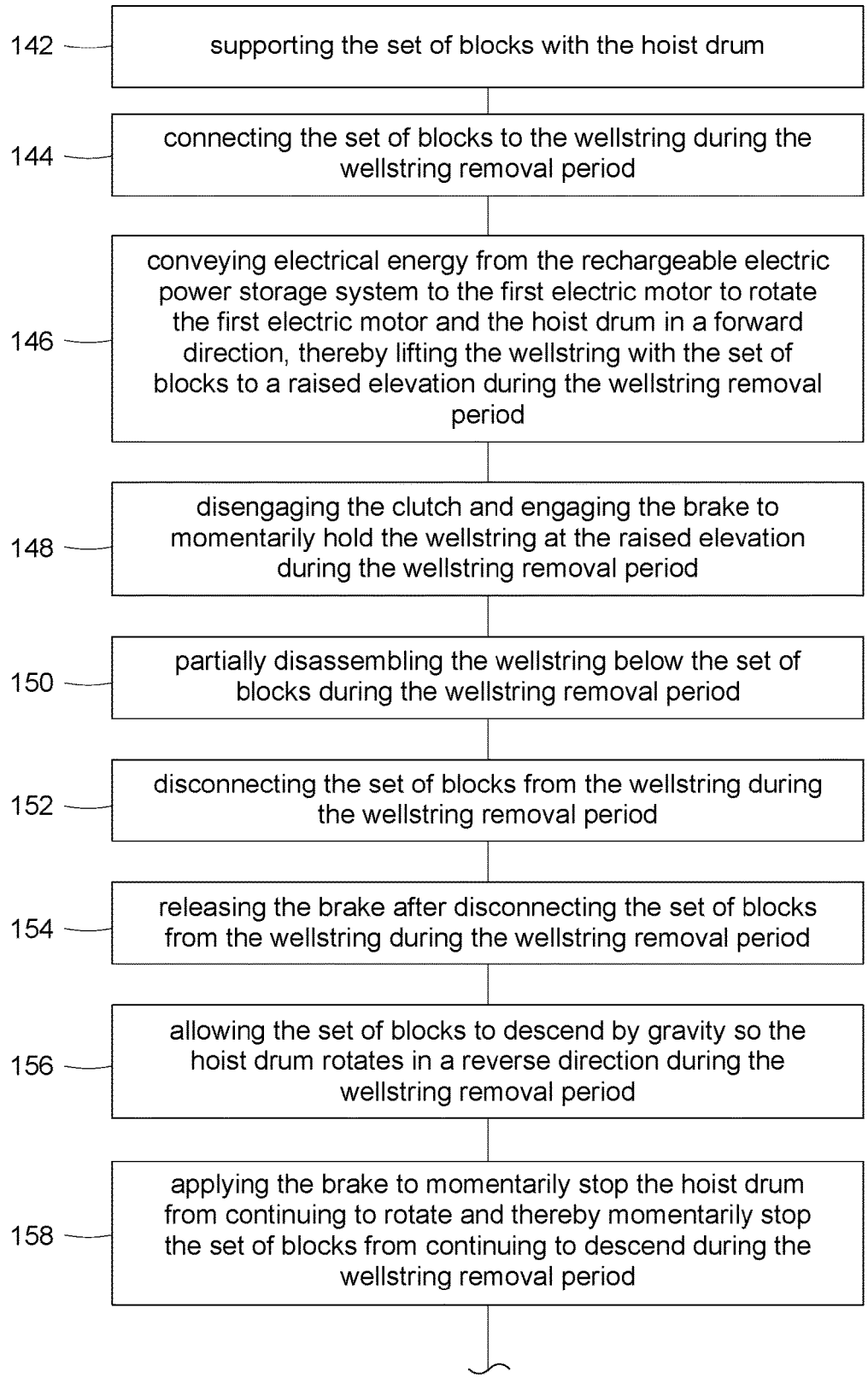

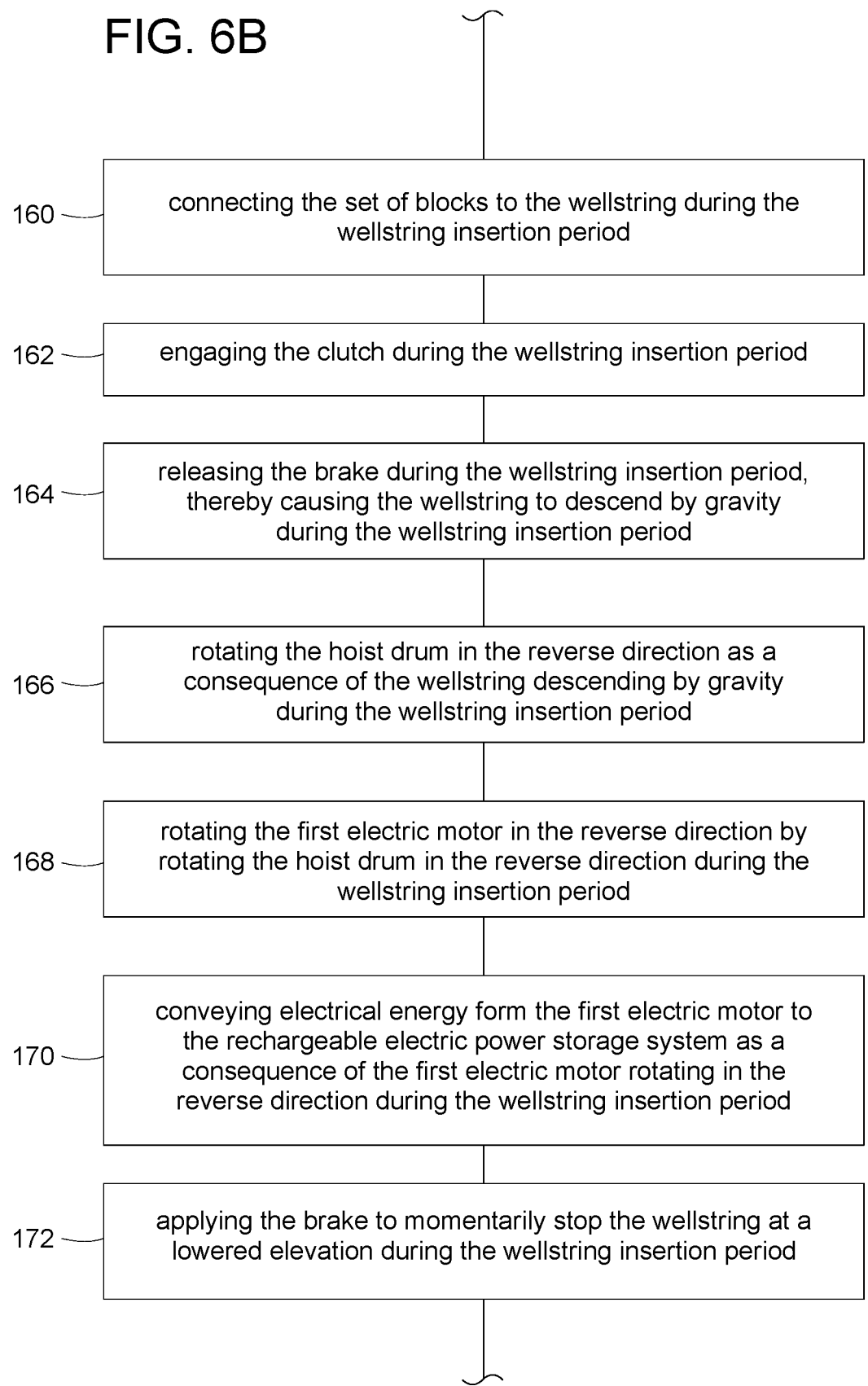

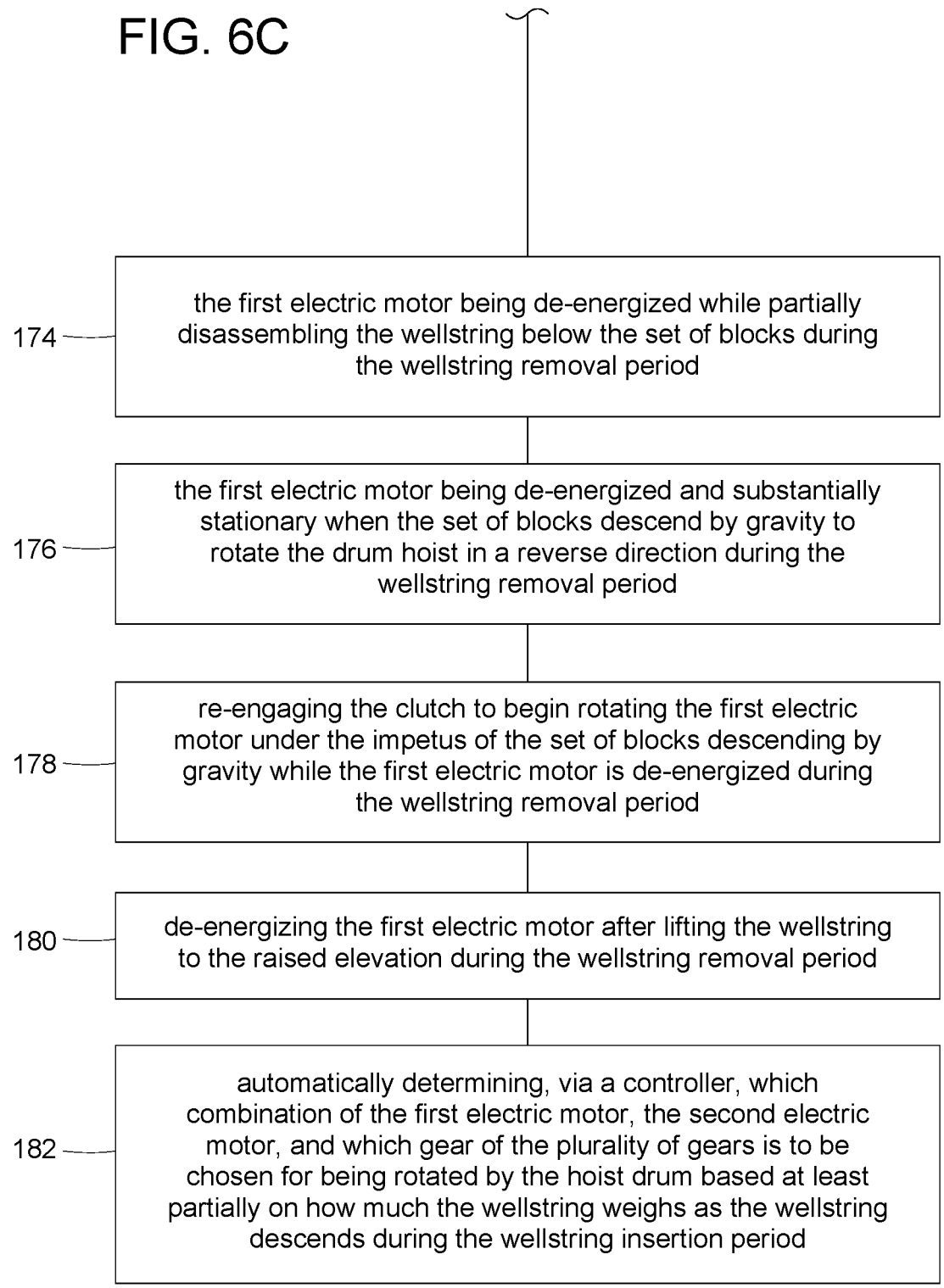

ELECTRIC WELL SERVICE RIG FOR ESP INSTALLATIONS

CROSS REFERENCE TO RELATED APPLICATIONS

This application is a continuation-in-part of co-pending patent application Ser. No. 17/497,829 filed on Oct. 8, 2021.

FIELD OF THE DISCLOSURE

This patent generally pertains to mobile service rigs for servicing wellbores at wellsites and more specifically to means for powering such rigs via a power source normally used for energizing an electric pump assembly at the wellsite.

BACKGROUND

Many oil and gas wells have years, if not decades, of economic production throughout their lifespan. These wells, however, require routine interventions to remain active. Wells are subject to adversities such as corrosive fluids and normal wear and tear, which can cause metal fatigue, embrittlement, holes in tubing, and damage to downhole pumps. When wells fail or otherwise need maintenance, a service rig is used for removing and subsequently replacing the damaged parts.

Well service rigs are overland traveling vehicles typically comprising a pivotal boom crane with a hoist drum. Often a multispeed transmission couples a 500 horsepower diesel engine to power the hoist drum.

The primary job of a service rig is to pull and run sucker rods and tubing into and out of a well. The rig is normally crewed by four workers, and the typical job at a single wellsite may last from a few hours, for a simple pump change, to several days for more complex problems, like finding tubing leaks. After the rig finishes its work and the well is placed back online, it travels to the next well where the lifting and running processes are repeated.

BRIEF DESCRIPTION OF THE DRAWINGS

FIG. 6 is a flow diagram comprising FIGS. 6A, 6B and 6C showing example mobile service rig methods associated with the mobile service rigs shown in FIGS. 1-5.

DETAILED DESCRIPTION

Figure 1:
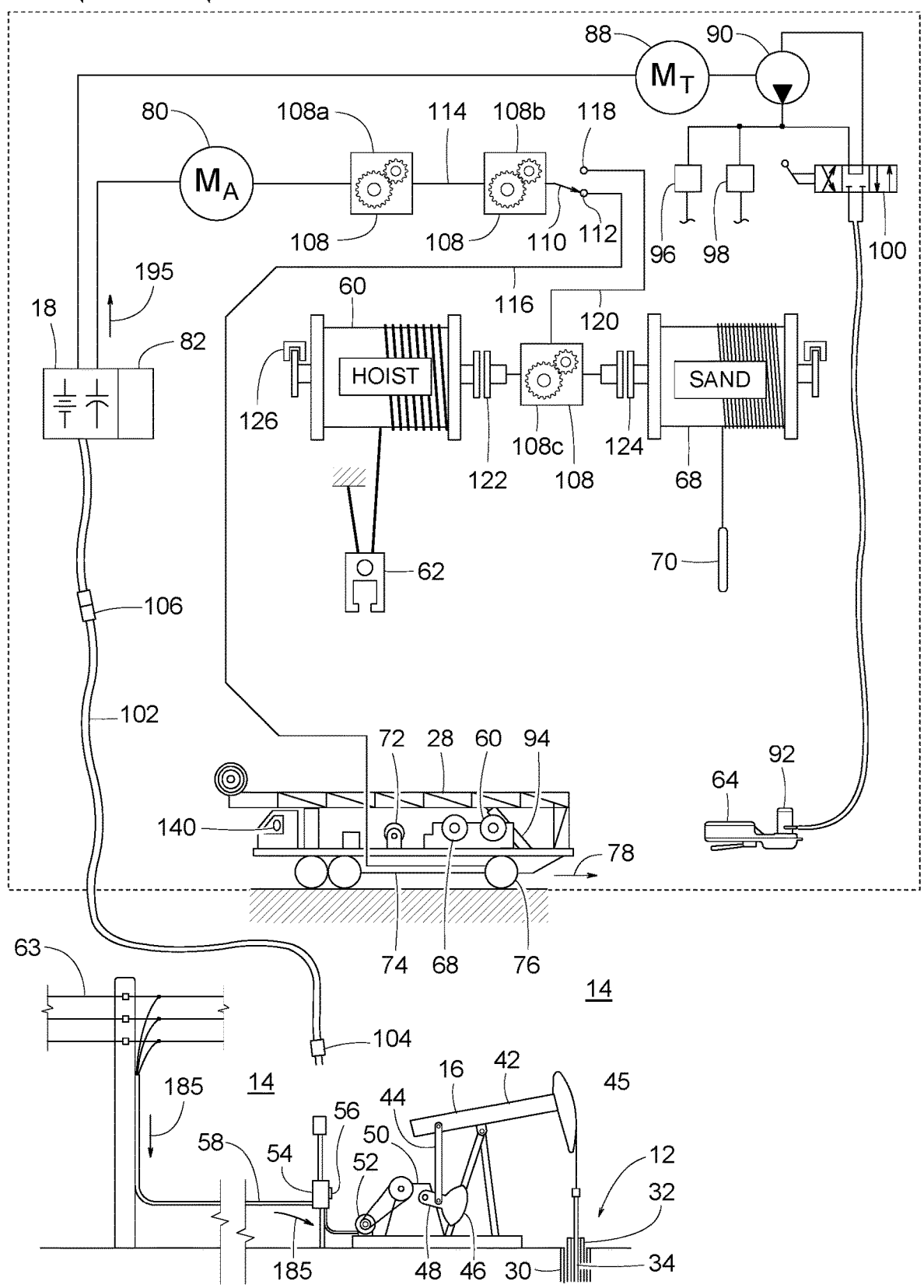
FIG. 1 is a schematic diagram of an example mobile service rig constructed in accordance with the teachings disclosed herein.

FIGS. 1-18 pertain to a mobile service rig 10 (e.g., mobile service rigs 10a, 10b and 10c) and related methods for servicing a wellbore 12 at a pumpjack installation 14 (FIGS. 1-3) or at an ESP installation 14' (FIGS. 15-18). The term, "ESP" stands for, "electrical submersible pump."

When a known pumpjack 16 of pumpjack installation 14 or a known submerged electric pump assembly 14' of ESP installation 202 is deactivated for the servicing of wellbore 12, the mobile service rig's onboard rechargeable electric power storage system 18 taps into the electric power source normally used for pumpjack 16 or submerged electric pump assembly 202. When pumpjack 16 or electric pump assembly 202 is inactive, tapping into its unused yet available electrical power makes it possible for mobile service rig 10 to operate without heavy reliance on large internal combustion engines.

Figure 2:
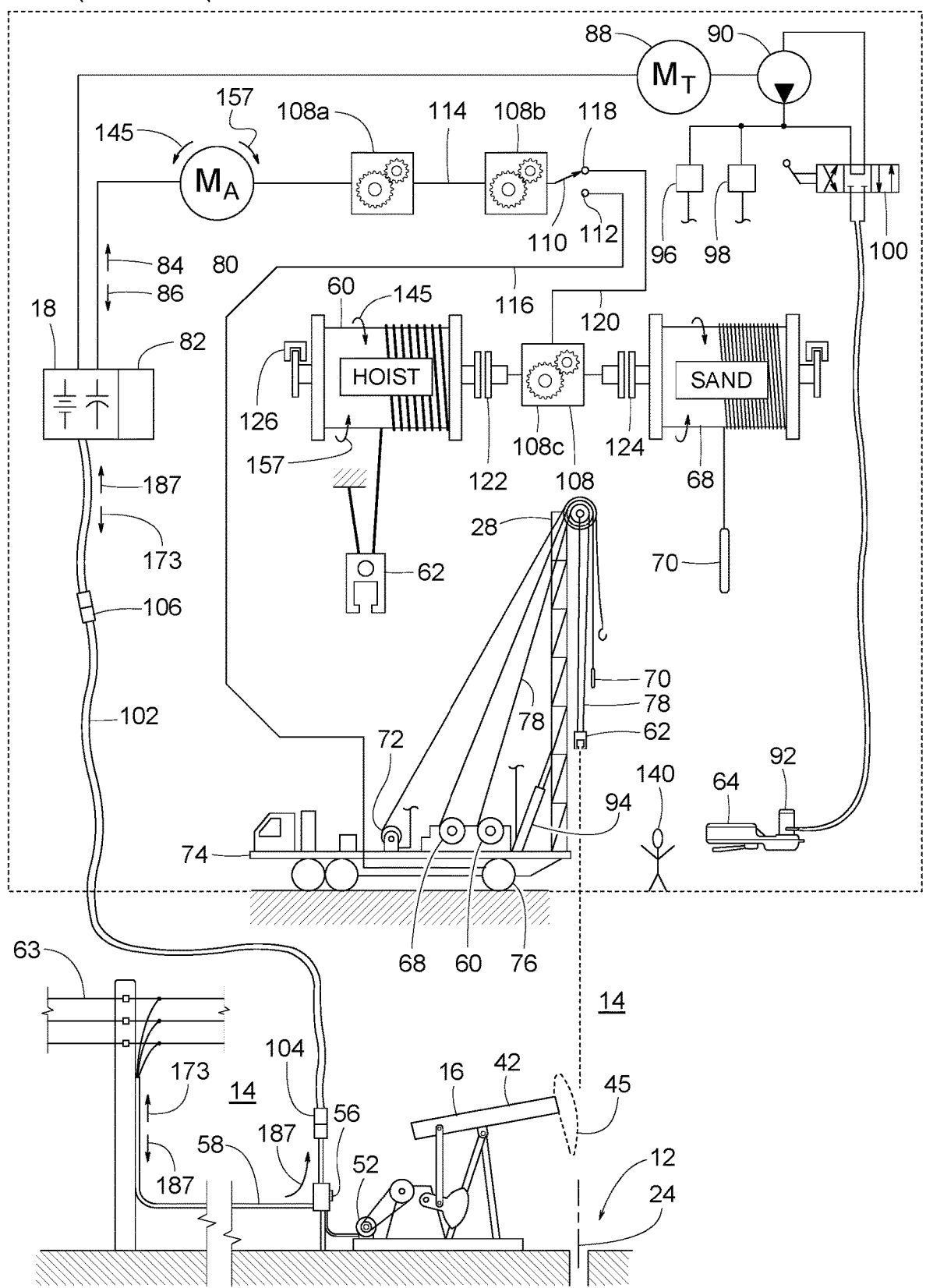
FIG. 2 is a schematic diagram similar to FIG. 1 but showing the rig's mast deployed.
Figure 3:
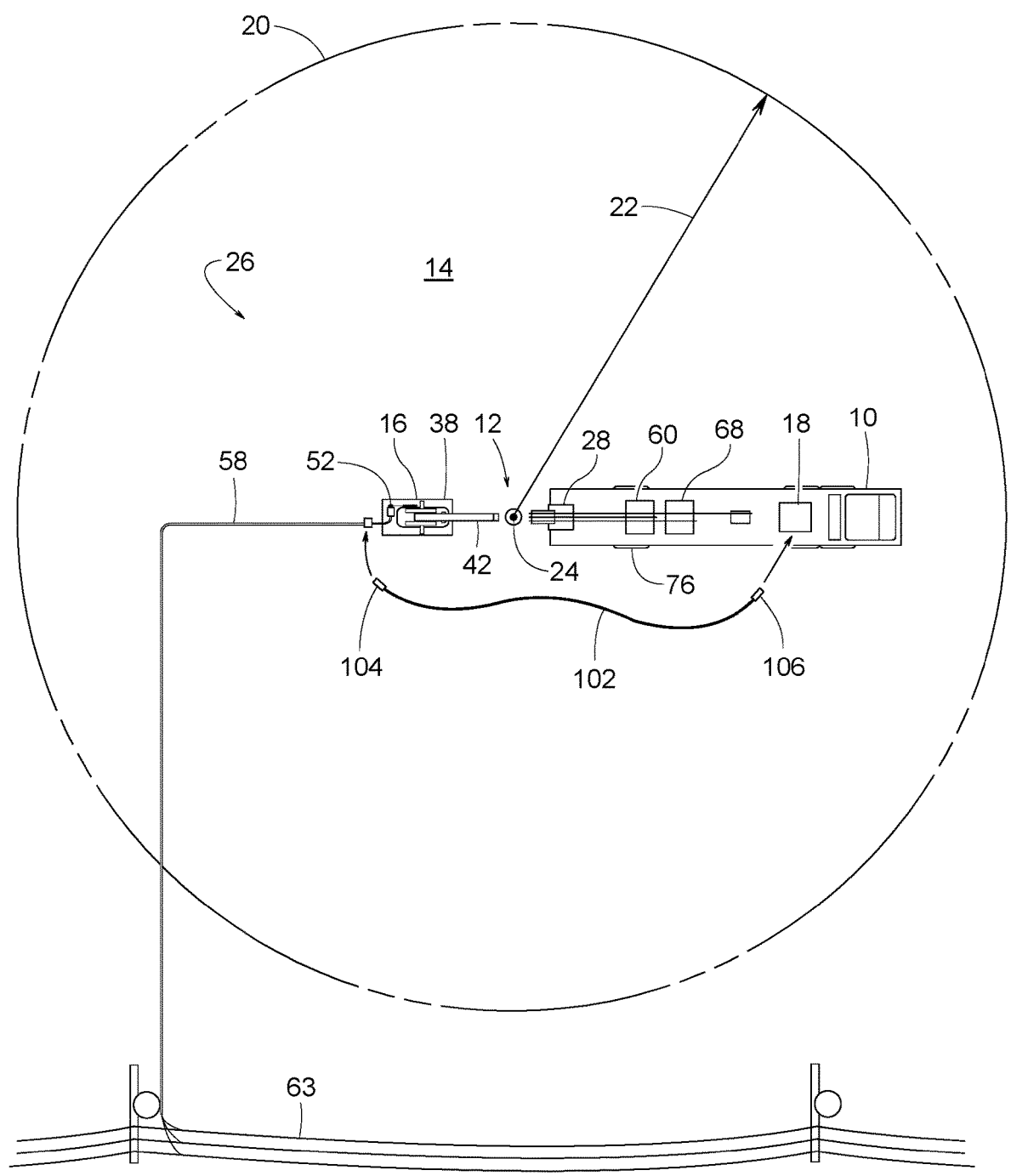
FIG. 3 is a schematic top view of the mobile service rig of FIGS. 1 and 2.
Figure 15:
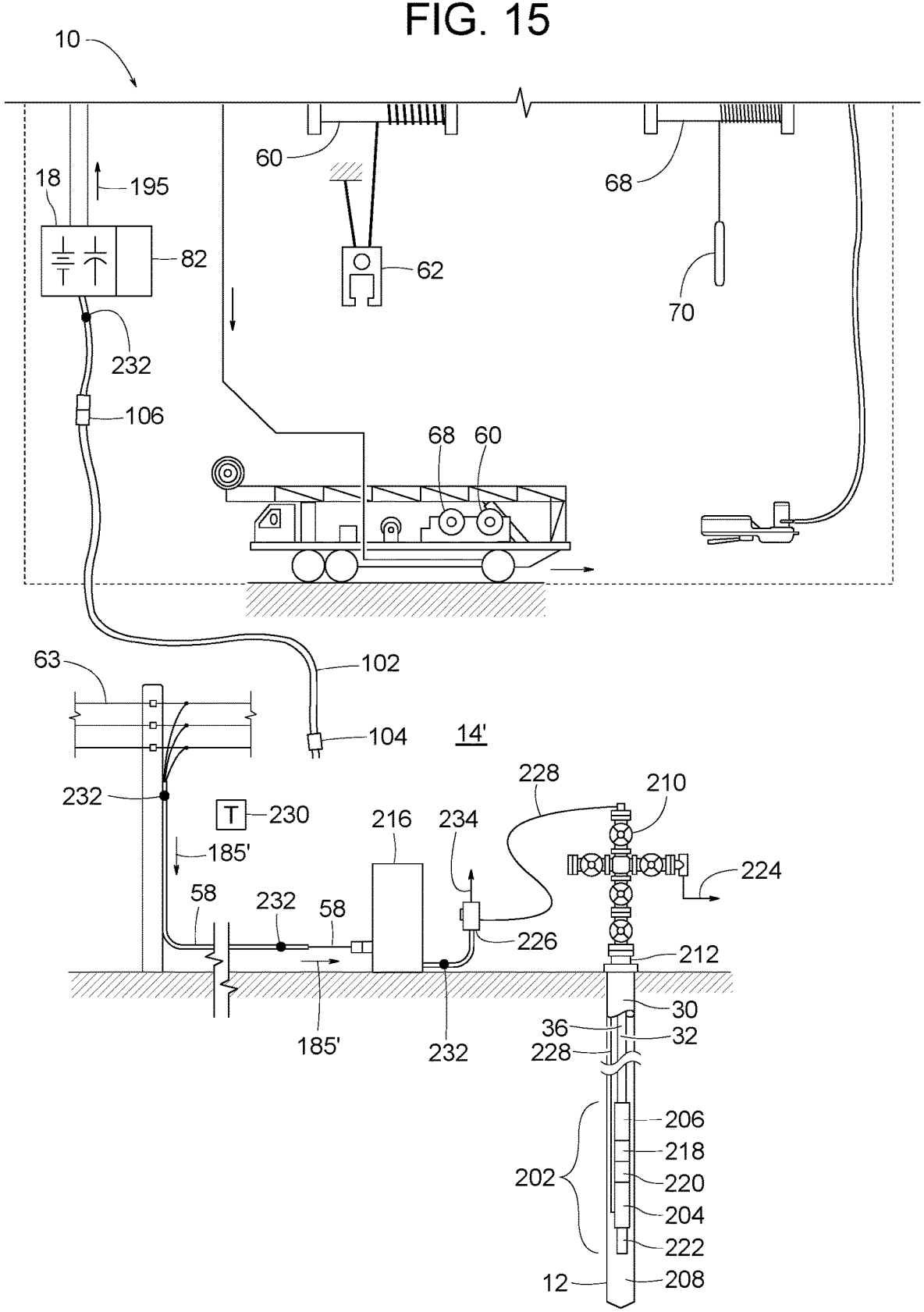
FIG. 15 is schematic diagram similar to FIG. 1 but showing the mobile service rig about to perform service at an ESP installation.
Figure 16:
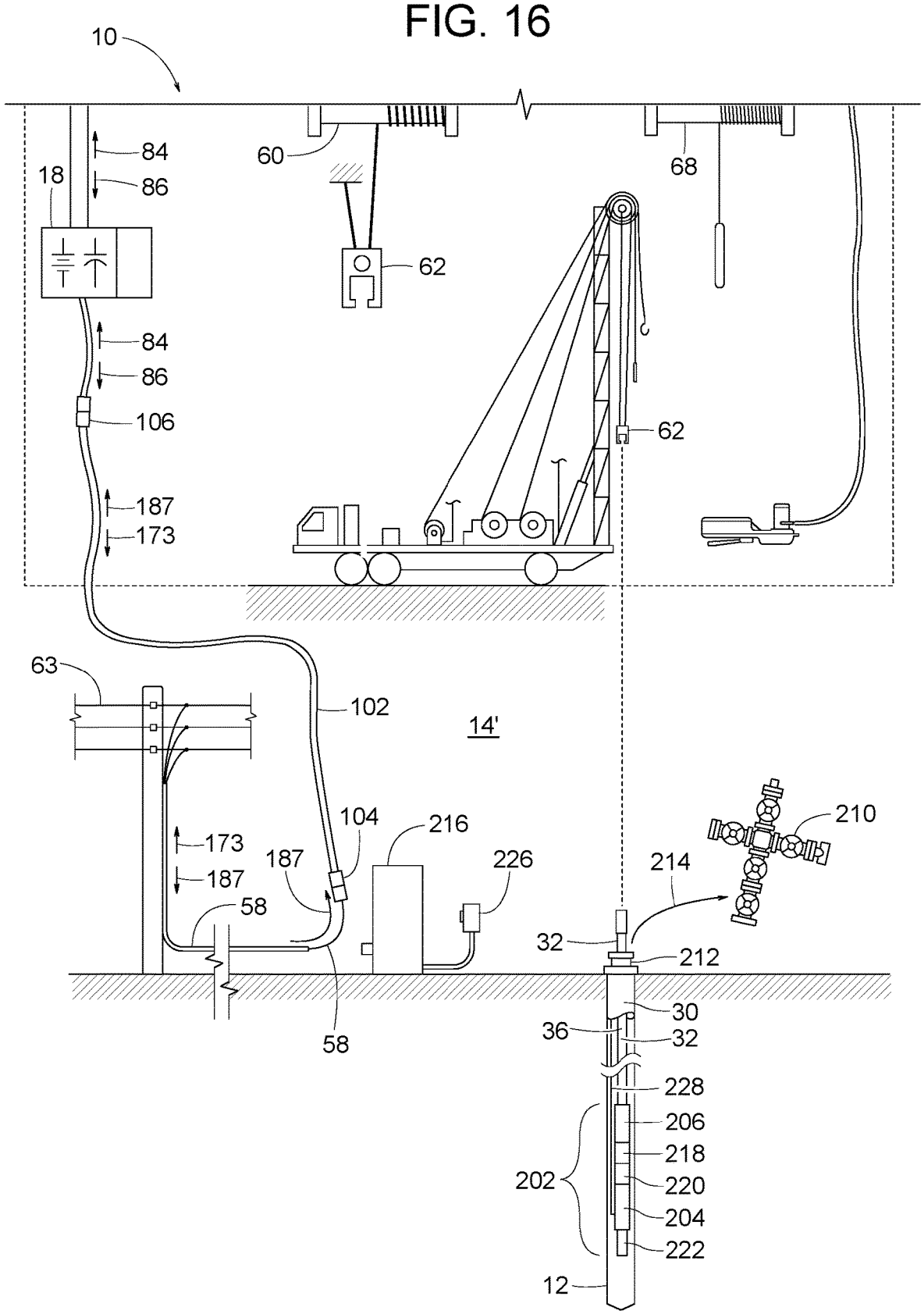
FIG. 16 is similar to FIG. 15 but showing the rig's mast deployed and a valve assembly removed from a wellhead.

Pumpjack installation 14, as shown in FIG. 3, comprises pumpjack 16 and a circular area of land 20, wherein pumpjack 16 is disposed within the circular area of land 20. The circular area of land 20 is defined by a radius 22 of 200 feet from a centerpoint 24 of wellbore 12. The term, "pumpjack" refers to any apparatus for actuating a submerged pump, wherein the pump is disposed deep within a wellbore. The term, "wellsite" refers to the general vicinity of wellbore 12 and pumpjack 16 (or electric pump assembly 202). Some examples of wellsite 26 are fully contained within the circular area of land 20. Some examples of wellsite 26 extend beyond the circular area of land 20. FIG. 1 shows mobile service rig 10 arriving at pumpjack installation 14. FIG. 15 shows mobile service rig 10 arriving at ESP installation 14'. FIGS. 2 and 16 show the mobile service rig's mast 28 raised and prepared for servicing wellbore 12.

Figure 17:
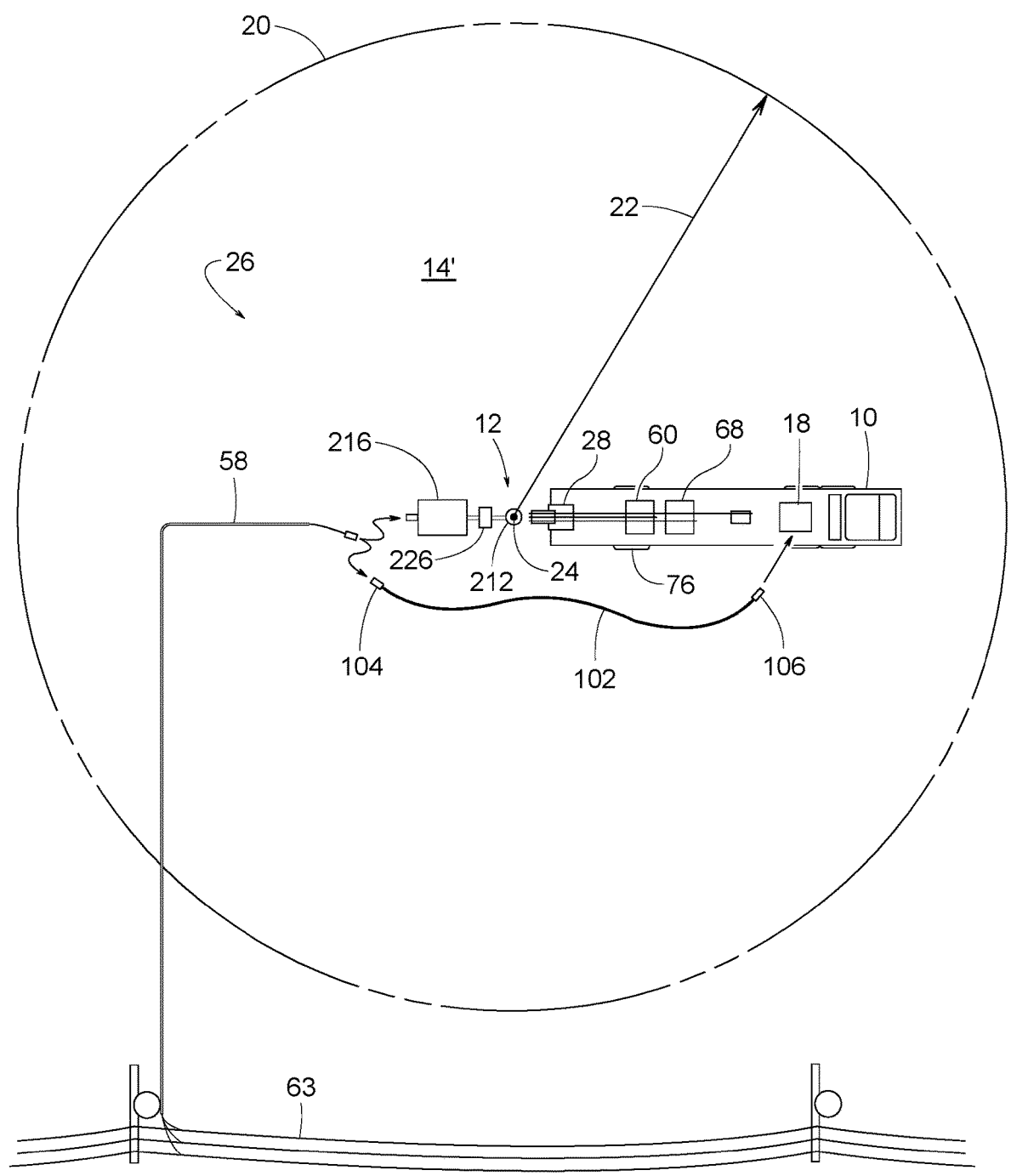
FIG. 17 is a schematic top view similar to FIG. 3 but showing the mobile service rig at the ESP installation shown in FIGS. 15 and 16.

The term, "wellbore" refers to a hole in the ground for extracting a fluid (e.g., oil, gas, water, etc.) up from within the ground. In some examples, wellbore 12 comprises a well casing 30 for lining the hole, an assembled string of tubing 32 for conveying the fluid up from within wellbore 12, and an assembled string of sucker rods 34 for operating a submerged reciprocal pump (not shown) at the bottom of tubing 34. Tubing 34 and sucker rods 32 are examples of a wellstring 36. The term, "wellstring" refers to any assembly of elongate segments for use in a wellbore. Pumpjack 16 drives the reciprocating motion of sucker rods 34 to operate the submerged pump. In the example of electric pump assembly 202, as shown in FIGS. 15-17, a pump motor 204 drives the rotation of a submerged pump 206 to pump a fluid 208 up through tubing 32.

In some examples, pumpjack 16 comprises a base 38; a frame 40 on base 38; a walking beam 42 pivoting on frame 40; a horse head 45 attached to the end of beam 42; a pitman arm 44, a counterweight 46 and a crank 48 for coupling a gear reducer 50 to walking beam 42; and an electric pumpjack motor 52 for rotating crank 48 to pivot walking beam 42 in a teeter-totter motion. In some examples, electric pumpjack motor 52 and/or pump motor 204 is rated at 40 to 50 HP (or more). In some examples, one or more electrical enclosures 54 with a disconnect switch 56 provide a junction box for running a wire 58 (of a plurality of wires) between an electrical power grid 63 and the electric pumpjack motor 52 or pump motor 204. The term, "electrical power grid" refers to a network of electrical transmission lines connecting multiple generating stations to a plurality of loads over an area spanning more than a mile.

Some example service operations performed by mobile service rig 10 on wellbore 12 include using a hoist drum 60 and set of blocks 62 for inserting tubing 32 in wellbore 12, using hoist drum 60 and blocks 62 for removing tubing 32 from within wellbore 12, using hoist drum 60 and blocks 62 for inserting sucker rods 34 in wellbore 12, using hoist drum 60 and blocks 62 for removing sucker rods 34 out from within wellbore 12, using hoist drum 60 and blocks 62 for replacing the submerged pump, assembling wellstring 36 with a set of tongs 64, and disassembling wellstring 36 with tongs 64.

It is well known to those of ordinary skill in the art that tongs 64 apply torque (e.g., torque 66 in FIG. 11) to a wellstring to either screw or unscrew one wellstring section relative to another. In some examples, a threaded coupling connects one wellstring section to an adjoining one. In some examples, the "threaded coupling" is an integral part of one end of each wellstring section.

Other example service operations performed by mobile service rig 10 include using a sand drum 68 for lowering various service tools 70 (e.g., casing perforating tools, sand extraction tools, inspection instruments, etc.) down into wellbore 12, using a winch 72 for tightening wind lines (not shown), and/or using winch 72 for removing/installing a valve assembly 210 and other various pick-and-place operations, etc. To gain access to wellbore 12, some service operations involve temporarily removing horse head 45 and disconnecting it from sucker rods 34. Some example service operations involve temporarily removing valve assembly 210 from wellhead 212. The disconnection and removal of horse head 45 or valve assembly 210 occurs during a setup mode and is depicted by dashed lines in FIG. 2 and line 214 in FIG. 16. The setup mode is when pumpjack 16 or electric pump assembly 202 is deactivated while the mobile service rig 10 is not yet connected to wellstring 36 in wellbore 12.

Mobile service rig 10 is operable selectively in a travel mode (e.g., FIGS. 1 and 15), a wellstring pulling mode (e.g., FIG. 9), a wellstring insertion mode (e.g., FIG. 13), and the setup mode. Mobile service rig 10 is operable during a pumping period (e.g., FIGS. 1 and 15) and during a service period (e.g., FIGS. 2, 8 and 16).

The service period can be subdivided into a wellstring removal period and a wellstring insertion period. The wellstring removal period refers to a stage of operation during which a first plurality of steps are performed, wherein completion of the first plurality of steps leads to at least some of wellstring 36 being removed out from within wellbore 12. Lifting of wellstring 36 and/or other activities generally associated with removing wellstring 36 occur during the wellstring removal period.

The wellstring insertion period refers to a stage of operation during which a second plurality of steps are performed, wherein completion of the second plurality of steps leads to at least some of wellstring 36 being inserted down into wellbore 12. Lowering of wellstring 36 and/or other activities generally associated with installing wellstring 36 occurs during the wellstring insertion period.

In some examples, mobile service rig 10 operates in the travel mode during the pumping period. In some examples, mobile service rig 10 operates in the wellstring pulling mode, the wellstring insertion mode, or the setup mode during the service period.

In some examples, as shown in FIGS. 1 and 2, mobile service rig 10*a* includes a chassis 74 (the rig's main structural frame), a set of drive wheels 76 for propelling chassis 74 in a traveling motion 78 during the travel mode; hoist drum 60 about which a wire rope 78 is wrapped for raising or lowering blocks 62, a first electric motor 80 coupled to rotate hoist drum 60 at least sometimes during the wellstring pulling mode (e.g., FIG. 8) and at least sometimes during the wellstring insertion mode (e.g., FIG. 12), and the rechargeable electric power storage system 18.

Rechargeable electric power storage system 18 is schematically illustrated to represent any electrical system for repeatedly storing and releasing electrical energy. Some examples of rechargeable electric power storage system 18 include a battery, a bank of batteries, a battery cluster, rechargeable batteries, lithium-ion batteries, lead-acid batteries, nickel-cadmium batteries, nickel manganese cobalt (NMC), lithium iron phosphate (LFP), nickel-metal hydride batteries, nickel-zinc batteries, flow battery (e.g., redox flow battery, iron-flow battery), lithium-ion polymer batteries, solid-state batteries, lithium metal polymer (LMP), supercapacitors, ultracapacitors, and various combinations thereof.

Rechargeable electric power storage system 18 includes circuitry for controlling, regulating and/or limiting the incoming and outgoing flow of electrical power. In some examples, such circuitry is part of a controller 82. Controller 82 is schematically illustrated to represent any electrical circuit for strategically directing or modifying the flow of electricity. Some examples of controller 82 include a computer, a microprocessor, a programmable logic controller (PLC), electromechanical relays, a battery management system (BMS), an inverter, a rectifier, and various combinations thereof. In some examples, controller 82 is at a single location. In some examples, controller 82 is distributed over multiple locations. In some examples, controller 82 includes a computer readable medium having stored thereon, in a non-transitory state, an executable program code that, when executed, causes certain intended physical outcomes.

In some examples, rechargeable electric power storage system 18 can store at least 75 kWh of electrical energy. In some examples, rechargeable electric power storage system 18 can discharge over 300 kW of electrical power to one or more motors of mobile service rig 10. In some examples, during recharging, rechargeable electric power storage system 18 draws no more than 50 kW of electrical power from the electrical power grid 63.

In some examples, the rechargeable electric power storage system 18 is used for powering the rotation of the set of drive wheels 76 during the travel mode (e.g., FIG. 1), for delivering electrical power 84 to the first electric motor 80 during the wellstring pulling mode, for receiving electrical power 86 from the first electric motor 80 during the wellstring insertion mode, for powering the rotation of sand drum 68, for powering winch 72, and/or for powering an auxiliary electric motor 88.

In some examples, auxiliary electric motor 88 powers a hydraulic pump 90. In some examples, hydraulic pump 90 powers winch 72, powers a hydraulic motor 92 of tongs 64, and/or powers a hydraulic cylinder 94 for raising mast 28 from a lowered position (FIG. 1) to a raised position (FIG. 2). In some examples, known control valves 96, 98 and 100 control the operation of winch 72, hydraulic cylinder 94, and tongs 64; respectively.

To exchange electrical power between rechargeable electrical power storage system 18 and electrical power grid 63, some examples of mobile service rig 10 include an electrical cable 102. In the example of FIGS. 1-3, electrical cable 102 connects the rechargeable electric power storage system 18 to the pumpjack installation 14 (e.g., at electrical enclosure 54) when mobile service rig 10 is at wellsite 26 to service wellbore 12 while pumpjack 16 is de-energized. During normal operation, however, when pumpjack 16 is energized for pumping fluid up from within wellbore 12, electrical cable 102 is disconnected from pumpjack installation 14 and/or from mobile service rig 10. While disconnected, some examples of electrical cable 102 have one end 104 that remains attached to pumpjack installation 14 during times of normal pumpjack operation. In addition or alternatively, some examples of electrical cable 102 have its other end 106 remain attached to mobile service rig 10 during times of normal pumpjack operation.

The term, "energize" as it relates to energizing a motor means supplying the motor with electrical power to rotate it. The term, "de-energize" as it relates to de-energizing a motor means to discontinue supplying the motor with electrical power. In some examples, mechanically rotating a de-energized motor results in the motor generating electrical power as opposed to consuming it.

Some examples of mobile service rig 10 include one or more gearboxes 108 (e.g., gearboxes 108a-108e) for mechanically coupling motors to various driven devices. The term, "gearbox" refers to any mechanism with at least two shafts and a plurality of interacting relative rotating elements that are configured to establish some relationship between the two shafts, wherein the relationship pertains to the relative rotational speed of the two shafts, the relative rotational direction of the two shafts, the relative torque transmitted by the two shafts, the angular orientation of the two shafts, and/or the selective engagement of one shaft to the other. Some examples of a gearbox include multi-speed transmissions, single-speed transmissions, gear reducers, speed reducers, torque converters, compound gearboxes, drop boxes, differentials, transfer cases, right-angle drives, an assembly of sprockets and chains, an assembly of intermeshing gears, drivetrains, driveshaft assemblies, axle assemblies, universal joints, clutches, brakes, and various combinations thereof. A wide assortment of known gearboxes are available through numerous sources such as, for example, Dana Limited of Maumee, Ohio, which produces gearboxes under the brand name of SPICER.

In the example shown in FIGS. 1 and 2, mobile service rig 10a includes first electric motor 80, auxiliary motor 88, and gearboxes 108a, 108b and 108c. In some examples, first electric motor 80 is rated at about 500 HP, and auxiliary motor 88 is rated at about 30 HP. In some examples, auxiliary motor 88 is less than one third the weight and rated horsepower of first electric motor 80. This provides an opportunity for leaving first electric motor 80 de-energized while rechargeable electric power storage system 18 supplies electric current to just auxiliary motor 88, which is much smaller, thereby saving valuable electrical energy.

In some examples of mobile service rig 10a, gearbox 108a is a multispeed transmission, gearbox 108b is a SPICER drop box, and gearbox 108c is a compound. When mobile service rig 10a is in a travel mode, as shown in FIG. 1, a lever 110 of gearbox 108b is kept at a first position 112 to convey power from an input shaft 114 to a first output shaft 116 of gearbox 108b. First electric motor 80 then powers the set of drive wheels 76 via first output shaft 116, as gearbox 108a serves as a transmission while mobile service rig 10a is traveling.

Figure 8:
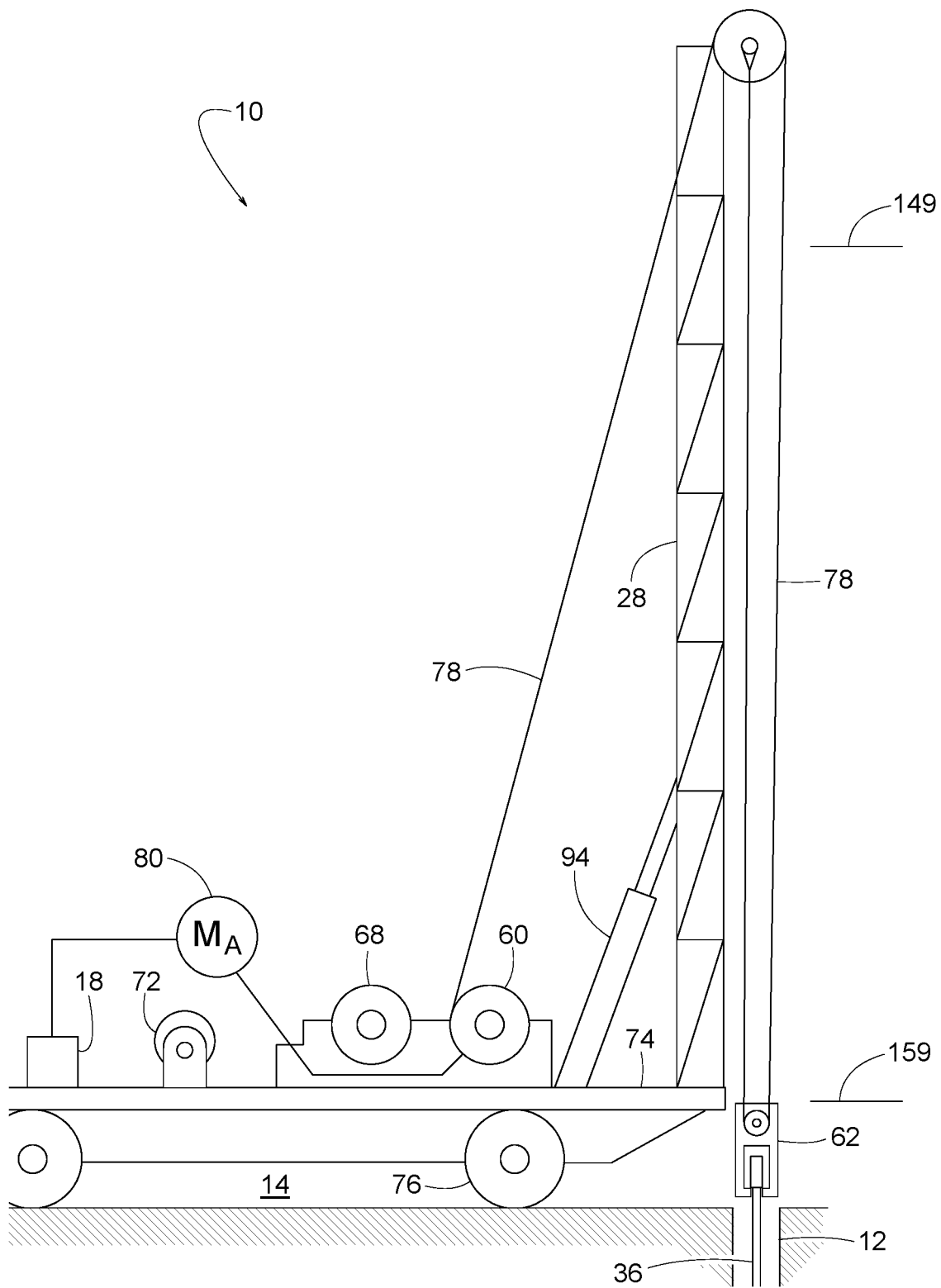
FIG. 8 is a schematic side view of the mobile service rigs shown in FIGS. 1-5, wherein the mobile service rig is in a wellstring pulling mode during a service period, and the blocks are at a lowered elevation.
Figure 9:
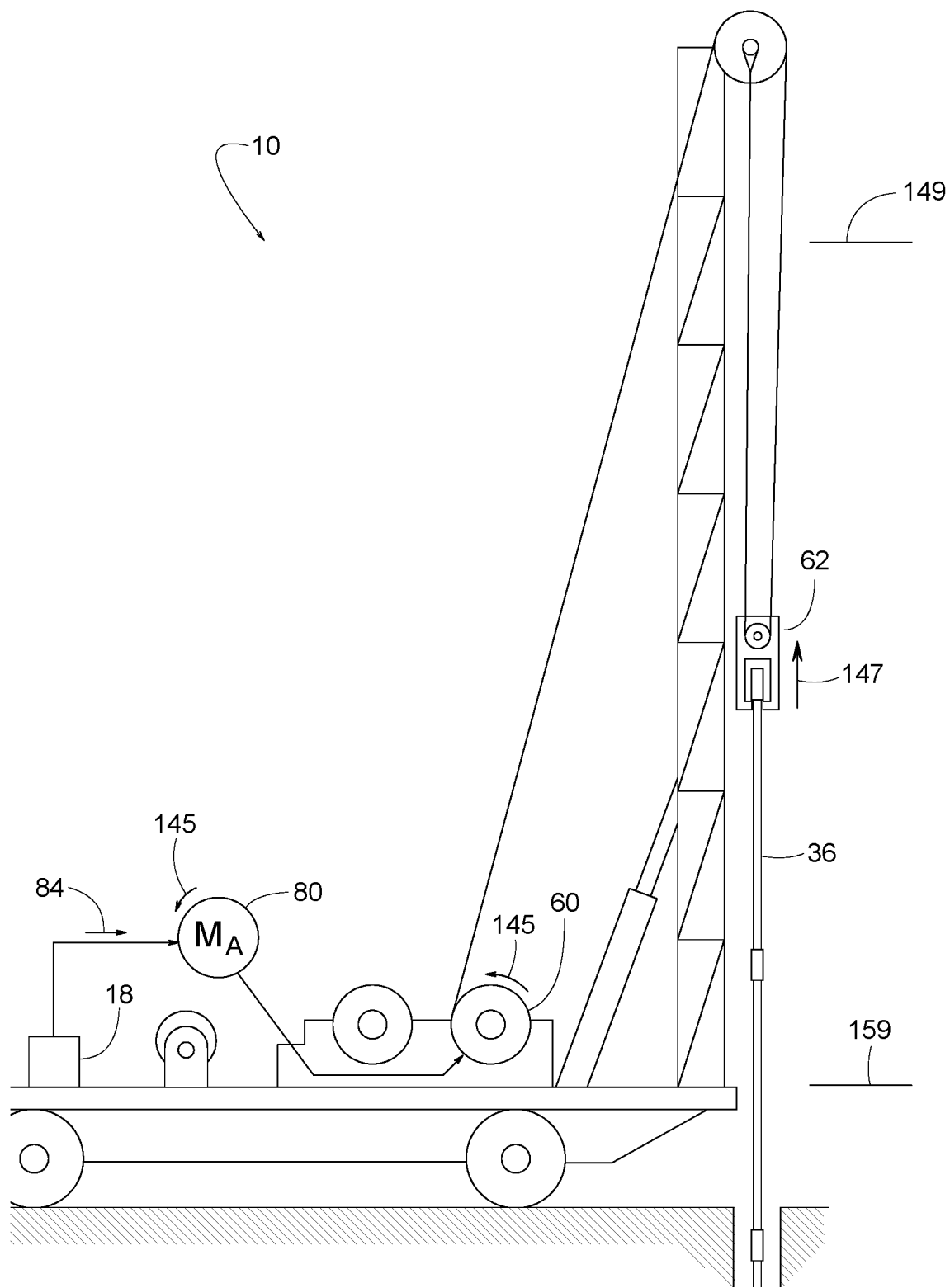
FIG. 9 is a schematic side view of the mobile service rigs shown in FIGS. 1-5, wherein the mobile service rig is in a wellstring pulling mode during a service period, and the blocks are moving upward between a lowered elevation and a raised elevation.

When mobile service rig 10a is in a wellstring pulling mode, as shown in FIG. 8, lever 110 of gearbox 108b is kept at a second position 118 (FIG. 2) to convey power from input shaft 114 to a second output shaft 120 of gearbox 108b. In some examples, the selective engagement of clutches 122 and 124 determines whether first electric motor 80 powers hoist drum 60 or sand drum 68 via second output shaft 120 and gearbox 108c, as gearbox 108a serves as a transmission.

In some examples, gearbox 108c serves as a right-angle drive when the rotational axis of second output shaft 120 is perpendicular to the rotational axes of hoist drum 60 and sand drum 68. In some examples, when the rotational axis of second output shaft 120 is parallel to the rotational axes of hoist drum 60 and sand drum 68, gearbox 108c comprises a couple of sprocket-and-chain assemblies that couple second output shaft 120 to drums 60 and 68.

In some examples, hoist drum 60 has a brake 126 for impeding the rotation of hoist drum 60. In some examples, hoist drum 60 has clutch 122 for selectively coupling hoist drum 60 to gearbox 108c.

Likewise, in some examples, sand drum 68 has a brake 128 for impeding the rotation of sand drum 68. In some examples, sand drum 68 has clutch 124 for selectively coupling sand drum 68 to gearbox 108c.

Figure 4:
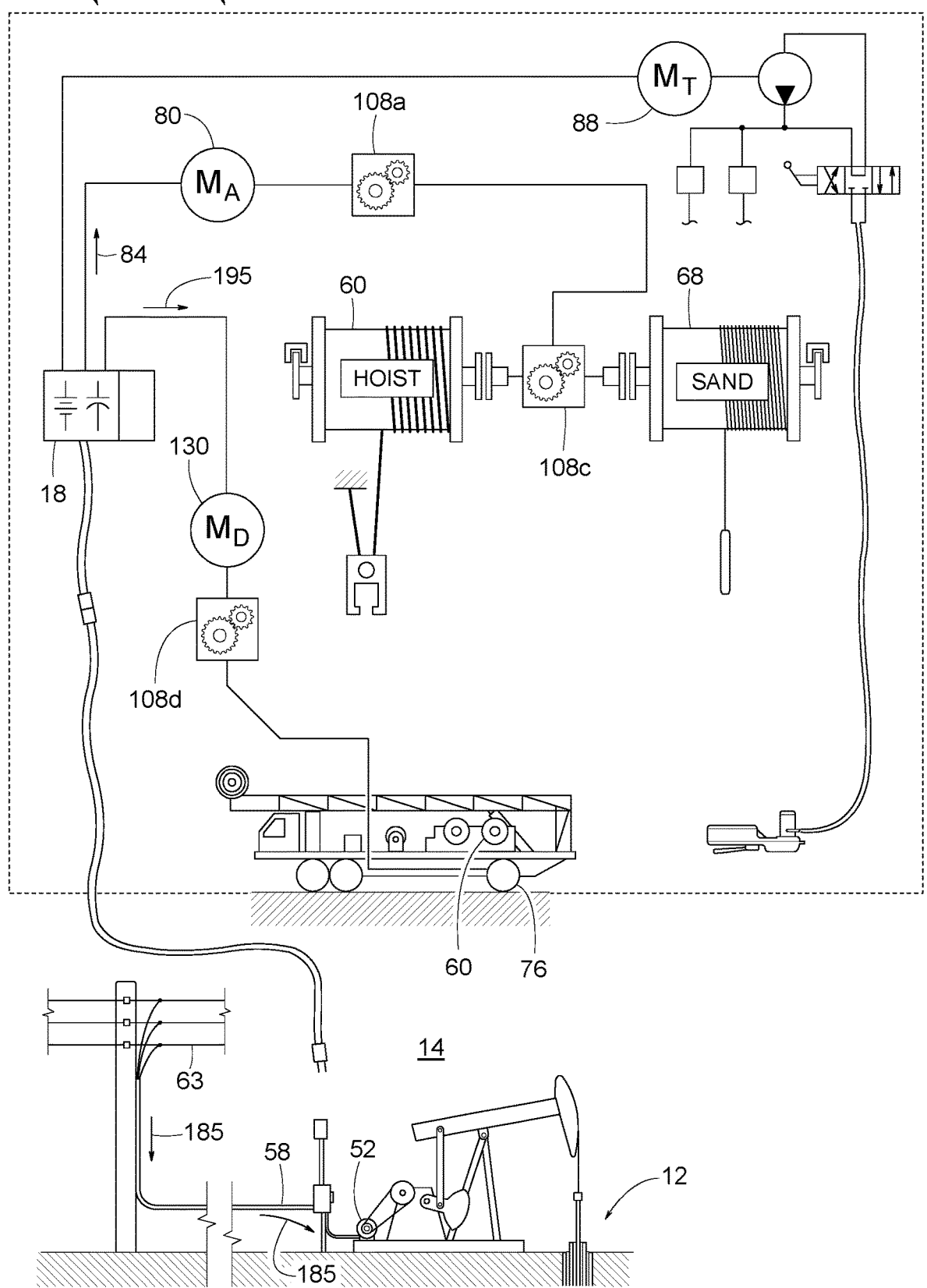
FIG. 4 is a schematic diagram similar to FIG. 1 but showing another example mobile service rig constructed in accordance with the teachings disclosed herein.

In the example shown in FIG. 4, mobile service rig 10b uses first electric motor 80 for powering drum 60 and/or 68 and uses a separate electric drive motor 130 for powering the set of drive wheels 76. Such an arrangement eliminates the need for gearbox 108b. Mobile service rig 10b, in some examples, includes gearbox 108a, gearbox 108c and gearbox 108d. In some examples, gearbox 108d is a speed reduction gear assembly. In some examples, electric drive motor 130 is a hub motor and gearbox 108d is an integral part of electric drive motor 130. Some examples of mobile service rig 10b include a plurality of electric drive motors 130 for individually powering a corresponding plurality of drive wheels 76. In some examples, first electric motor 80 is a hub motor mounted directly to hoist drum 60, and gearbox 108*a* is an integral part of first electric motor 80. In some examples, first electric motor 80 is a hub motor mounted directly to sand drum 68, and gearbox 108*a* is an integral part of first electric motor 80.

Figure 5:
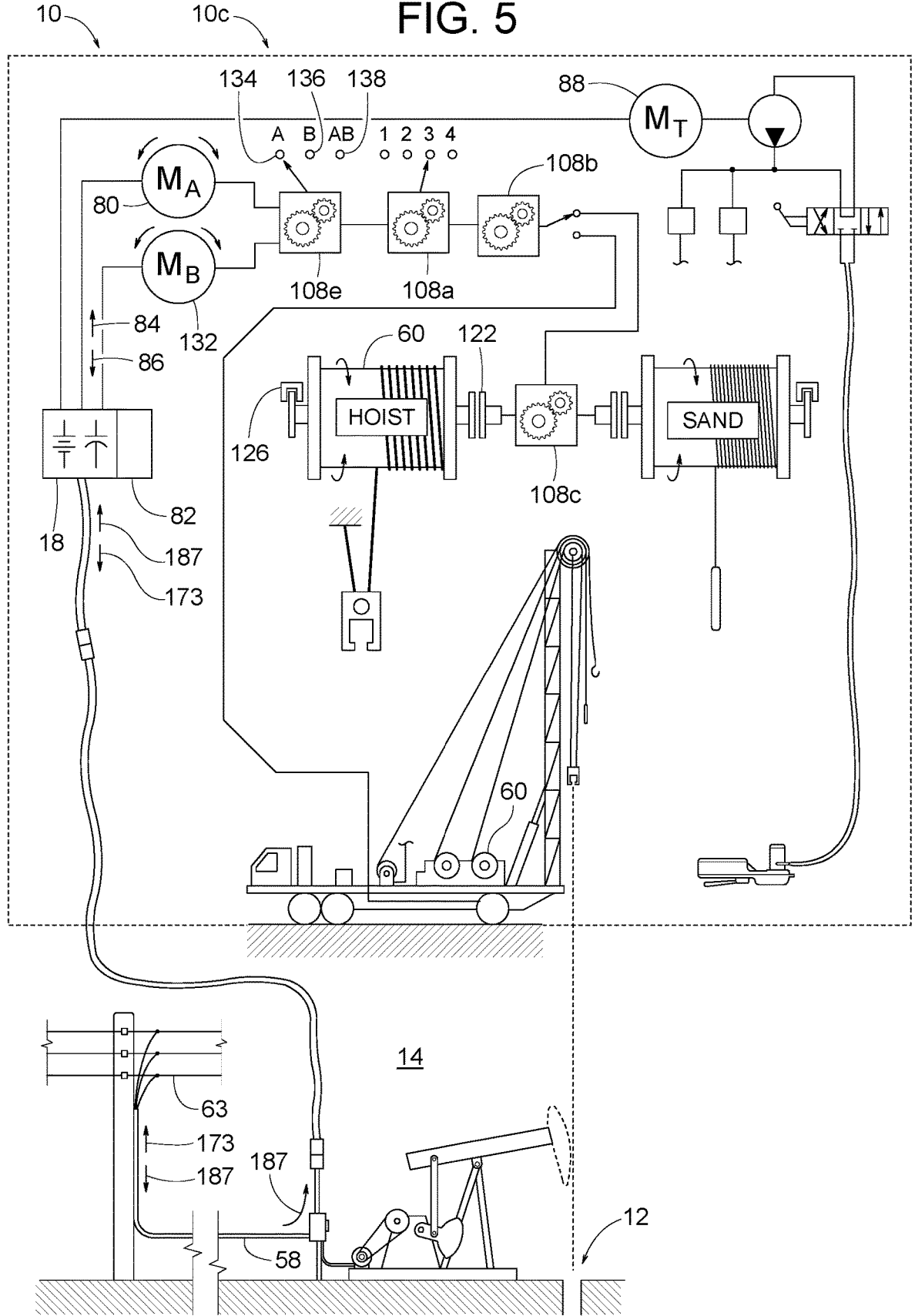
FIG. 5 is a schematic diagram similar to FIG. 2 but showing yet another example mobile service rig constructed in accordance with the teachings disclosed herein.

In the example shown in FIG. 5, mobile service rig 10*c* includes first electric motor 80, a second electric motor 132, and gearbox 108*e*. The combination of first electric motor 80, second electric motor 132 and gearbox 108*e* is used as an alternative to using just first electric motor 80.

In some examples, gearbox 108*e* is a compound that selectively determines whether power to gearbox 108*a* is (a) from first electric motor 80 alone, (b) from second electric motor 132 alone, or (c) from a combination of both electric motors 80 and 132. In some examples, electric motors 80 and 132 are of the same rated horsepower. In some examples, electric motors 80 and 132 are of different rated horsepower. In some examples, first electric motor 80 is rated at 300 HP, and second electric motor 132 is rated at 200 HP, whereby gearbox 108*e* can selectively transfer 200 HP, 300 HP or 500 HP, as needed.

In some examples, gearbox 108*a* is a multi-speed transmission (e.g., 8-speed, 4-speed, or some other number of speeds). In some examples, gearbox 108*a* is a single-speed transmission. For sake of example, FIG. 5 shows gearbox 108*a* having a selection of four speeds.

FIG. 5 also shows gearbox 108*e*. In some examples, gearbox 108*e* provides a selection of three motor combinations (e.g., a first configuration 134, a second configuration 136, and a third configuration 138). First configuration 134 corresponds to power being provided by first electric motor 80 alone. Second configuration 136 corresponds to power being provided by second electric motor 132 alone. Third configuration 138 corresponds to power being provided by a combination of both electric motors 80 and 132. Gearbox 108*e* having three choices and gearbox 108*a* having four choices renders mobile service rig 10*c* with twelve motor/gear combinations (3×4=12). In some examples, controller 82 automatically selects the optimum motor/gear combination based on the weight of wellstring 36.

Figure 7:
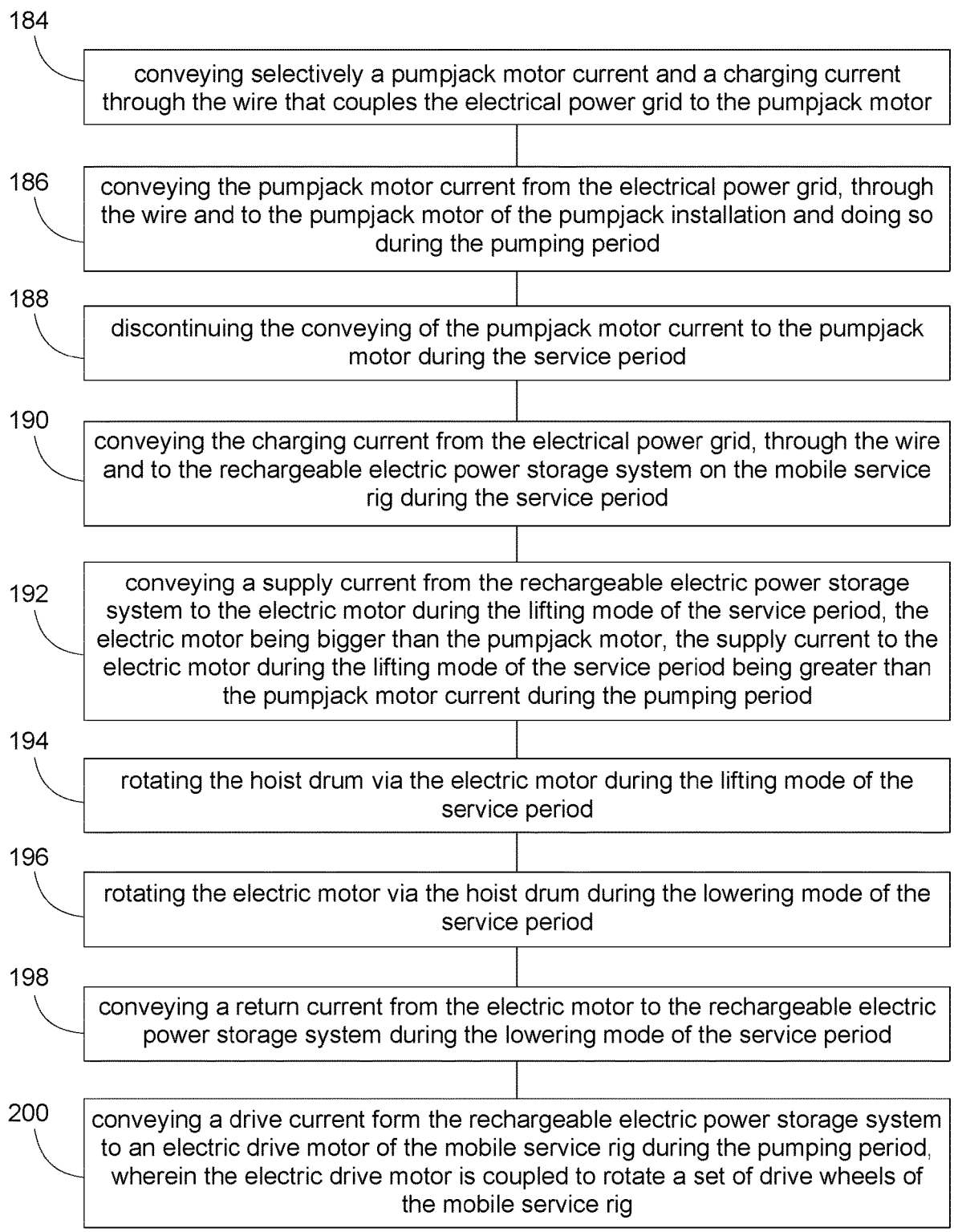
FIG. 7 is a flow diagram showing example mobile service rig methods associated with the mobile service rigs shown in FIGS. 1-5.

FIG. 6 (i.e., FIGS. 6A, 6B and 6C) and FIG. 7 illustrate various mobile service rig method steps. In some examples, some of the steps are optional and can be omitted. In some examples, the steps can be performed in a different sequence. In some examples, the method steps can be performed by at least one of mobile service rig 10, controller 82 of mobile service rig 10, and a human worker 140; wherein human worker 140 is associated with at least one of mobile service rig 10, pumpjack installation 14, ESP installation 14', wellbore 12, and electrical power grid 63.

Figure 10:
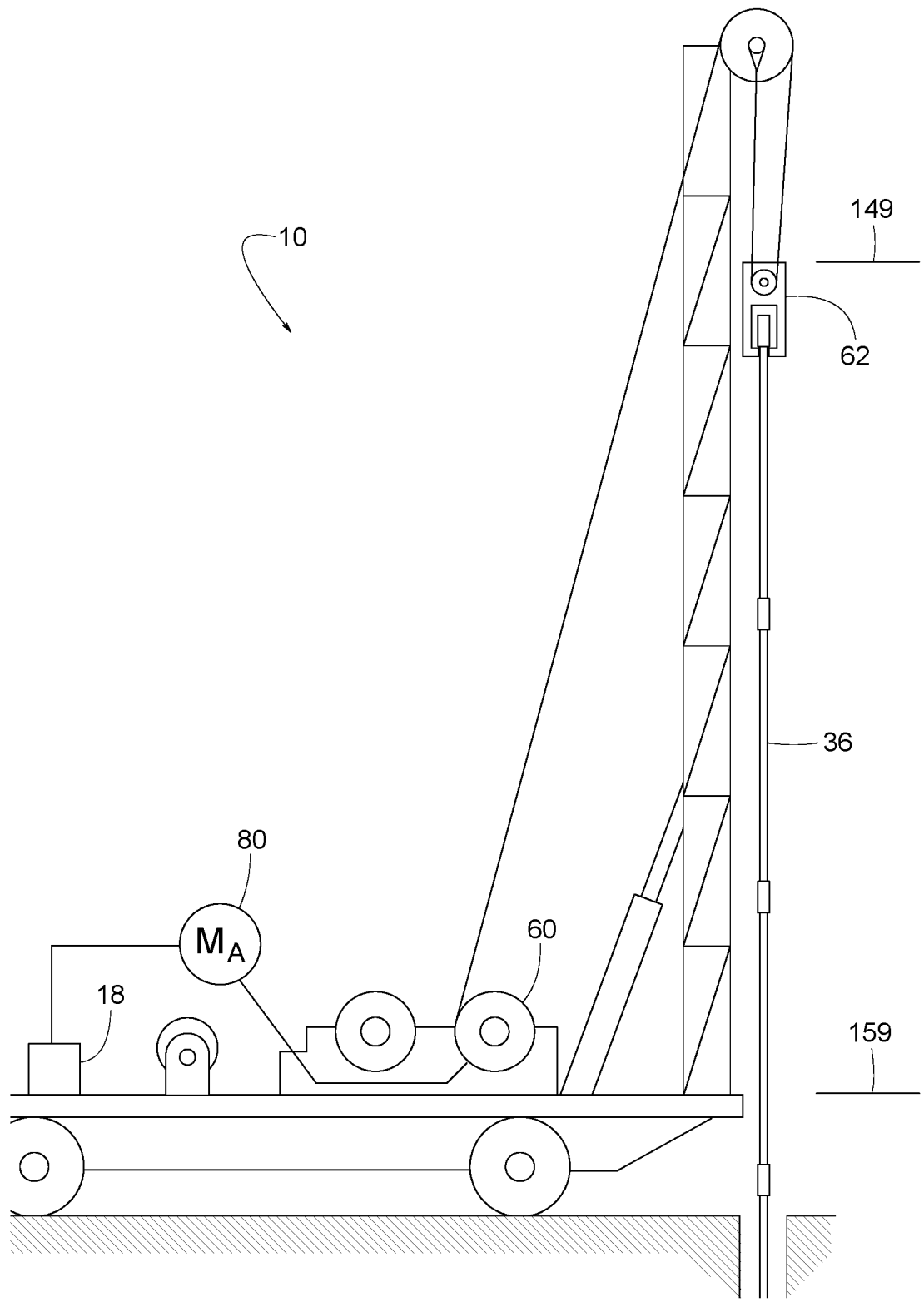
FIG. 10 is a schematic side view of the mobile service rigs shown in FIGS. 1-5, wherein the mobile service rig is in a wellstring pulling mode during a service period, and the blocks are at a raised elevation.
Figure 11:
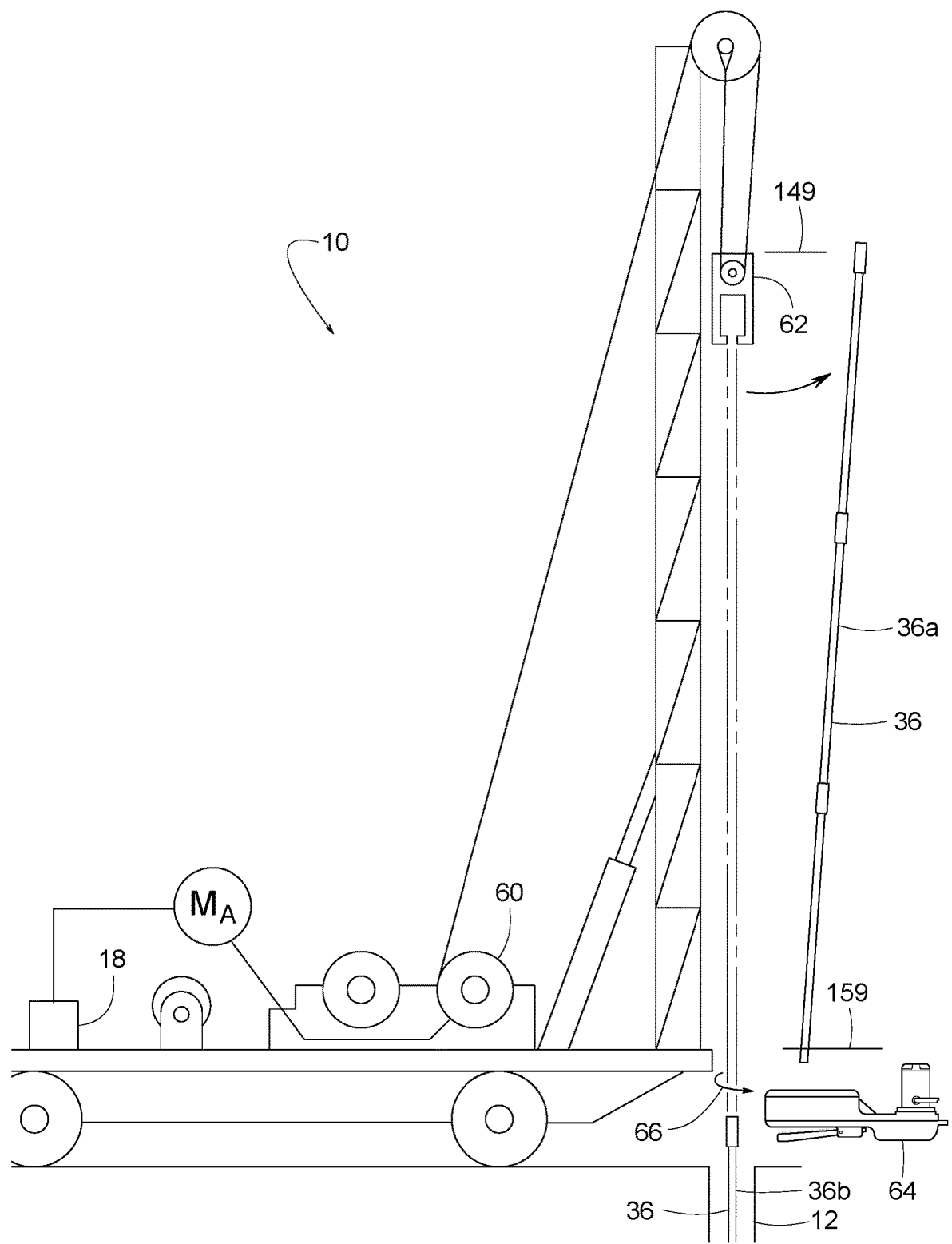
FIG. 11 is a schematic side view of the mobile service rigs shown in FIGS. 1-5, wherein the mobile service rig is in a wellstring pulling mode during a service period, and a section of wellstring has been removed from the remaining wellstring.
Figure 12:
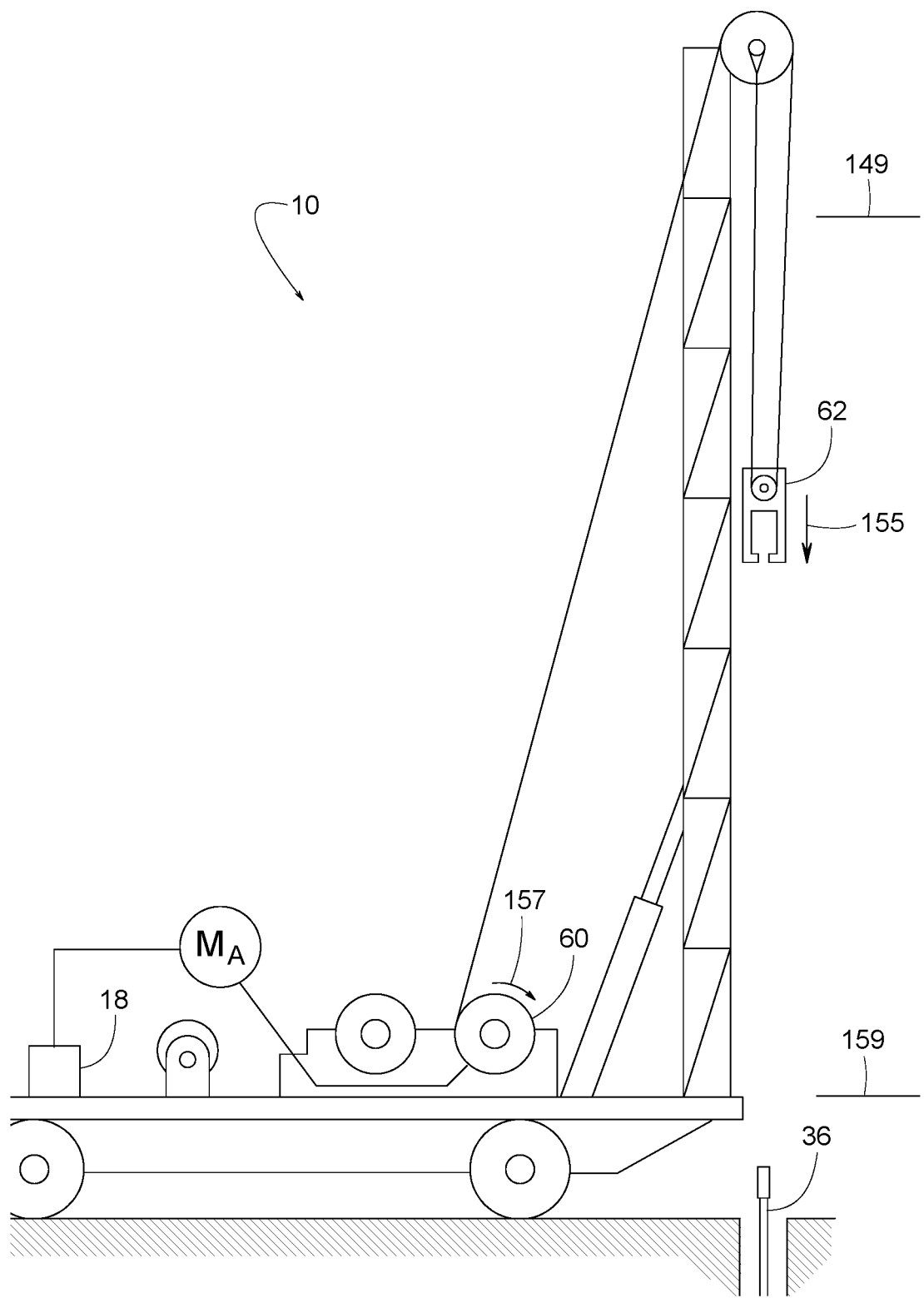
FIG. 12 is a schematic side view of the mobile service rigs shown in FIGS. 1-5, wherein the mobile service rig is in a wellstring pulling mode during a service period, and the blocks are descending by gravity back down to the remaining wellstring.

In FIG. 6A, a block 142 represents and FIG. 2 shows supporting the set of blocks 62 with the hoist drum 60. Block 144 in FIG. 6A represents and FIG. 8 shows connecting the set of blocks 62 to the wellstring 36 during the wellstring removal period. Block 146 in FIG. 6A represents conveying electrical energy 84 from the rechargeable electric power storage system 18 to the first electric motor 80 to rotate the first electric motor 80 and the hoist drum 60 in a forward direction 145, thereby lifting 147 (FIG. 9) the wellstring 36 with the set of blocks 62 to a raised elevation 149 during the wellstring removal period. Block 148 in FIG. 6A represents disengaging the hoist clutch 122 and engaging the hoist brake 126 to momentarily hold the wellstring 36 at the raised elevation 149 during the wellstring removal period, as shown in FIG. 10. Block 150 in FIG. 6A represents and FIG. 11 shows using tongs 64 for partially disassembling the wellstring 36 below the set of blocks 62 during the wellstring removal period. This allows an upper section 36*a* of wellstring 36 to be separated from a lower section 36*b* of wellstring 36. In some examples, a known set of slips (not shown) grips the lower section 36*b* to prevent it from dropping down into wellbore 12 when no longer supported by the set of blocks 62. Block 152 in FIG. 6A represents and FIG. 11 shows disconnecting the set of blocks 62 from the wellstring 36 during the wellstring removal period. Block 154 in FIG. 6A represents and FIG. 12 shows releasing the hoist brake 126 after disconnecting the set of blocks 62 from the wellstring 36 during the wellstring removal period. Block 156 in FIG. 6A represents and FIG. 12 shows allowing the set of blocks 62 to descend 155 by gravity so the hoist drum 60 rotates in a reverse direction 157 during the wellstring removal period. Block 158 in FIG. 6A represents applying the hoist brake 126 to momentarily stop the hoist drum 60 from continuing to rotate and thereby momentarily stop the set of blocks 62 from continuing to descend during the wellstring removal period. In some examples, the hoist brake 126 stops the set of blocks 62 at a lowered elevation 159. In some example methods, the steps represented by block 142-158 is repeated until the entire wellstring 36 is removed.

The term, "forward direction," as it refers to the rotation of a motor or a hoist drum (that are mechanically coupled to each other) means that the motor and hoist drum's rotation are configured to raise a load suspended from the hoist. In the forward direction, the motor and the hoist drum may be rotating in the same direction or in opposite directions, depending on the particular mechanical coupling between the motor and the hoist drum. The term, "reverse direction," means that the motor and hoist drum's rotation are configured to lower the load.

Figure 13:
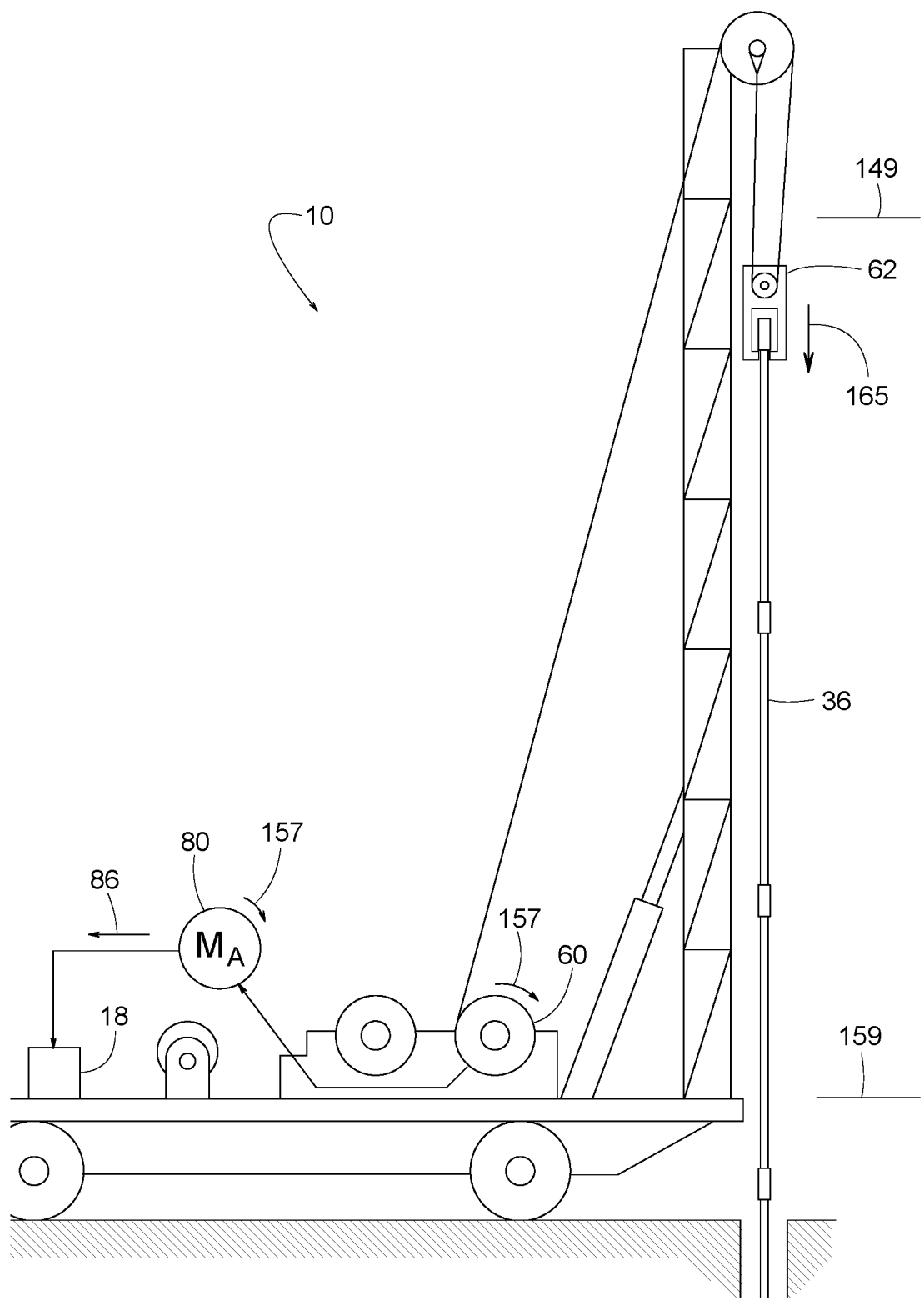
FIG. 13 is a schematic side view of the mobile service rigs shown in FIGS. 1-5, wherein the mobile service rig is in a wellstring insertion mode during a service period, and the blocks and suspended wellstring are descending by gravity.
Figure 14:
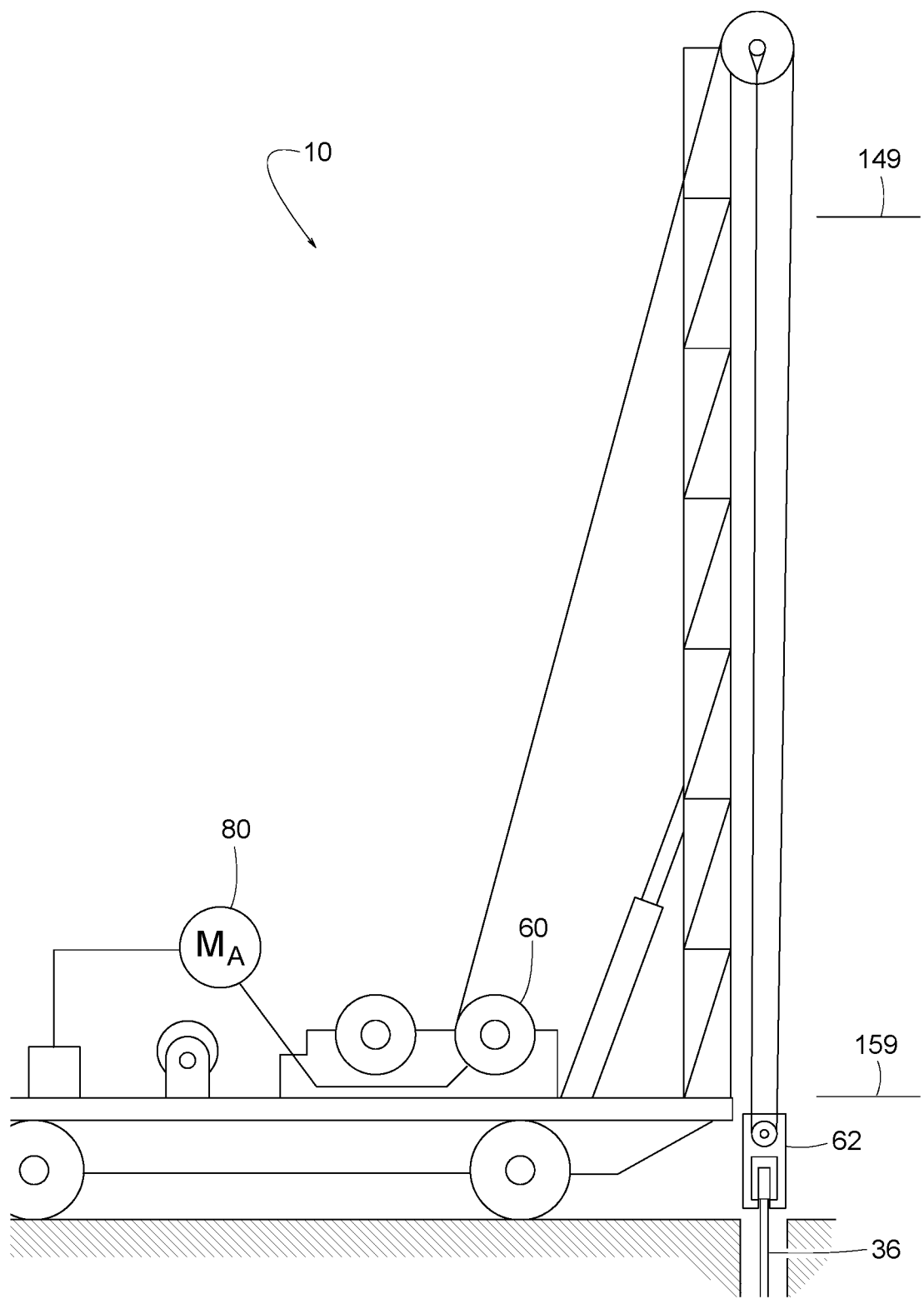
FIG. 14 is a schematic side view of the mobile service rigs shown in FIGS. 1-5, wherein the mobile service rig is in a wellstring insertion mode during a service period, and the blocks are paused at a lowered elevation.

In FIG. 6B, a block 160 represents connecting the set of blocks 62 to the wellstring 36 during the wellstring insertion period. Block 162 in FIG. 6B represents engaging the clutch 122 during the wellstring insertion period. Block 164 in FIG. 6B represents and FIG. 13 shows releasing the hoist brake 126 during the wellstring insertion period, thereby causing the wellstring 36 to descend 165 by gravity during the wellstring insertion period. Block 166 in FIG. 6B represents and FIG. 13 shows rotating the hoist drum 60 in the reverse direction 157 as a consequence of the wellstring 36 descending 165 by gravity during the wellstring insertion period. Block 168 in FIG. 6B represents rotating the first electric motor 80 in the reverse direction 157 by rotating the hoist drum 60 in the reverse direction 157 during the wellstring insertion period. Block 170 of FIG. 6B represents conveying electrical energy 86 form the first electric motor 80 to the rechargeable electric power storage system 18 as a consequence of the first electric motor 80 rotating in the reverse direction 157 during the wellstring insertion period. In some examples, when rechargeable electric power storage system 18 is fully charged, excess electrical power 173 from motor 80 is conveyed to electrical power grid 63. Block 172 of FIG. 6B represents and FIG. 14 shows applying the hoist brake 126 to momentarily stop the wellstring 36 at the lowered elevation 159 during the wellstring insertion period.

In FIG. 6C, a block 174 represents the first electric motor 80 being de-energized while partially disassembling the wellstring 36 below the set of blocks 62 during the wellstring removal period. Block 176 in FIG. 6C represents the first electric motor 80 being de-energized and substantially stationary when the set of blocks 62 descend 165 by gravity to rotate the drum hoist 60 in a reverse direction 157 during the wellstring removal period. Block 178 in FIG. 6C represents re-engaging the clutch 122 to begin rotating the first electric motor 80 under the impetus of the set of blocks 62 descending by gravity while the first electric motor 80 is de-energized during the wellstring removal period. Block 180 in FIG. 6C represents de-energizing the first electric motor 80 after lifting the wellstring 36 to the raised elevation 149 during the wellstring removal period.

Block 182 in FIG. 6C represents automatically determining, via controller 82, which combination of the first electric motor 80, the second electric motor 132, and which gear of the plurality of gears (gearbox 108a of FIG. 5) is to be chosen for being rotated by the hoist drum 60 based at least partially on how much the wellstring 36 weighs as the wellstring 36 descends during the wellstring insertion period. Rather than relying on hoist brake 126 to slow the descent of wellstring 36, some example mobile service rig methods instead rely on the rotational inertia of motors 80 and/or 132. Using motor inertia instead of braking saves energy and avoids overheating brake 126.

In some examples, a desired rate of wellstring descent is achieved by strategically selecting the most suitable combination of first electric motor 80, second electric motor 132, and which gear of the plurality of gears of gearbox 108a. In some examples, controller 82 determines the best combination based on the wellstring's weight, which will vary with the wellstring's length. In some examples, controller 82 determines the wellstring's weight based on how fast wellstring 36 descended on one or more previous descents. In some examples, controller 82 determines the wellstring's weight based on feedback from a load sensor. In some examples, controller 82 automatically determines the optimum combination of first electric motor 80, second electric motor 132, and which gear of the plurality of gears of gearbox 108a by executing an algorithm programmed and stored on controller 82.

In some examples, controller 82 provides an output that shifts gearbox 108a and 108e to achieve the desired suitable combination of first electric motor 80, second electric motor 132, and which gear of the plurality of gears of gearbox 108a. In some examples, worker 140 shifts gearboxes 108a and 108e in response to controller 82 signaling or informing worker 140 as to the proper combination of first electric motor 80, second electric motor 132, and which gear of the plurality of gears of gearbox 108a.

In FIG. 7, a block 184 represents conveying selectively a pumpjack motor current 185 and a charging current 187 through wire 58, wherein wire 58 is the electrical conductor that electrically couples the electrical power grid 63 to the pumpjack motor 52 during the pumping period. Block 186 in FIG. 7 represents conveying the pumpjack motor current 185 from the electrical power grid 63, through the wire 58 and to the pumpjack motor 52 of the pumpjack installation 14 and doing so during the pumping period. The pumping period is when pumpjack 16 is activated to pump fluid up from within wellbore 12. Block 188 in FIG. 7 represents discontinuing the conveying of the pumpjack motor current 185 to the pumpjack motor 52 during the service period. The service period is when the pumpjack 16 is deactivated and no longer pumping fluid, thereby allowing mobile service rig 10 to work on wellstring 36. Block 190 in FIG. 7 represents conveying a charging current 187 from the electrical power grid 63, through wire 58 and to the rechargeable electric power storage system 18 on the mobile service rig 10 during the service period. This helps recharge the rechargeable electrical power storage system 18 and/or helps power electric motors 80, 88 and/or 132. Block 192 in FIG. 7 represents conveying a supply current 84 from the rechargeable electric power storage system 18 to electric motor 80 during a wellstring pulling mode of the service period, the electric motor 80 being bigger than the pumpjack motor 52, the supply current 84 to the electric motor 80 during the wellstring pulling mode of the service period being greater than the pumpjack motor current 185 during the pumping period. In some examples, electric motor 80 is larger than pumpjack motor 185 with respect to both weight and rated horsepower. Block 194 in FIG. 7 represents rotating the hoist drum 60 via the electric motor 80 during the wellstring pulling mode of the service period. Block 196 in FIG. 7 represents rotating electric motor 80 via hoist drum 60 during the wellstring insertion mode of the service period. In some examples, electric motor 80 functions as a generator as its being rotated by hoist drum 60. In some examples, electric motor 80 functioning as a generator helps recharge the rechargeable electric power storage system 18. Block 198 in FIG. 7 represents conveying a return current 86 from electric motor 80 to the rechargeable electric power storage system 18 during the insertion mode of the service period. In some examples, return current 86 helps recharge the rechargeable electric power storage system 18. Block 200 in FIG. 7 represents conveying a drive current 195 from the rechargeable electric power storage system 18 to electric drive motor 130 of the mobile service rig 10 during the pumping period, wherein the electric drive motor 130 is coupled to rotate the set of drive wheels 76 of the mobile service rig 10 during its travel mode.

The terms, "momentarily stop" and "momentarily hold" as it relates to a structure (e.g., wellstring 36, hoist drum 60, blocks 62, an electric motor, etc.) means that the structure pauses or becomes substantially stationary for some limited period (i.e., not permanently).

The term, "exchange electrical energy" as it pertains to two structures (e.g., first electric motor 80 and a rechargeable electric storage system 18) means that electrical current can flow from one structure to the other structure and vice versa.

The term, "engaging the clutch" as it relates to a clutch that couples two rotatable member means that the clutch is selectively configured to allow one of the members to rotate relative to the other.

The term, "disengaging the clutch" as it relates to a clutch that couples two rotatable members means that the clutch is selectively configured to hold one of the members substantially stationary relative to the other.

The term, "releasing the brake" as it relates to a rotatable member means to allow the rotatable member to rotate.

The term, "applying the brake" as it relates to a rotatable member means to hold the rotatable member substantially stationary or at least resist its rotation.

In this description, many of the components, operations and method steps illustrated in FIGS. 1-14 are explained with reference to pumpjack installation 14; however, those same components, operations and method steps also apply to ESP installation 14', as shown in FIGS. 15-18. For instance, each of the example mobile service rigs 10 (e.g., mobile service rigs 10a, 10b, and 10c) for servicing pumpjack installation 14 can be used for servicing ESP installation 14' as well.

ESP installation 14, as shown in FIG. 17, comprises circular area of land 20, a motor controller 216 within the circular area of land 20, wellhead 212 on top of wellbore 12, electric pump assembly 202 disposed within wellbore 12, and wellstring 36 (e.g., tubing 32) connecting electric pump assembly 202 to wellhead 212. The circular area of land 20 is defined by a radius 22 of 200 feet from a centerpoint 24 of wellhead 212. Wellhead 212 is the structure on top of the wellbore 12. Wellhead 212 connects to the well's casing 30 and tubing 32. Wellhead 212 provides the structural and pressure-containing interface for drilling and production equipment.

During normal fluid pumping operation, valve assembly 210 is attached to wellhead 212, as shown in FIG. 15. Valve assembly 210 is well known to those of ordinary skill in the art and is oftentimes referred to as a "Christmas tree." Arrow 214 of FIG. 16 represents removing valve assembly 210 to provide well service rig 10 access to tubing 32 and electric pump assembly 202.

In some known examples, electric pump assembly 202 comprises submerged pump 206, a gas separator 218, a seal 220, the pump motor 204, and a downhole sensor 222. Pump motor 204 drives the rotation of submerged pump 206 to pump fluid 208 (e.g., oil, gas, etc.) up through tubing 32. Gas separator 218 directs liquid fluid 208 into submerged pump 206 and diverts gaseous fluid 208 around it. Seal 220 helps prevent liquid fluid 208 from entering pump motor 204. Downhole sensor 222 senses various conditions associated with electric pump assembly 202. Some examples of such conditions include fluid temperature, motor temperature, fluid pressure, vibration, etc.

During normal operation, when ESP installation 14' is being used for pumping fluid 208 up through tubing 32 and delivering the fluid out through a production line 224, pump motor 204 receives electrical power from power grid 63. In some examples, electricity flows from power grid 63, through wire 58, through motor controller 216, through a vented junction box 226, and through an electrical cable 228 that leads to pump motor 204. In some examples, one or more transformers 230 change the voltage of the electricity flowing between power grid 63 and pump motor 204 so the voltage is suitable for motor controller 216 and/or pump motor 204. In some examples, one or more transformers 230 include or are associated with a rectifier or an inverter for AC/DC conversion. Points 232 identify possible transformer locations.

Motor controller 216 is schematically illustrated to represent any electrical system for adjusting, regulating, and/or monitoring the operation of pump motor 204. Some examples of motor controller 216 adjust the pump motor's speed.

In some examples, vented junction box 226 contains an electrical connection between motor controller 216 and electrical cable 228. In some examples, gases from wellbore 12 that may have seeped into the outer lining of electrical cable 228 are safely vented out through vented junction box 226, as indicated by arrow 234.

In the example of FIGS. 15-17, electrical cable 102 connects the rechargeable electric power storage system 18 to the ESP installation 14' (e.g., in the vicinity of the power input side of motor controller 216) when mobile service rig 10 is at wellsite 26 to service wellbore 12 while pump motor 204 of electric pump assembly 202 is de-energized (FIG. 16). During normal operation, however, when pump motor 204 is energized (FIG. 15) for pumping fluid 208 up from within wellbore 12, electrical cable 102 is disconnected from ESP installation 14' and/or from mobile service rig 10. While disconnected, some examples of electrical cable 102 have one end 104 that remains attached to ESP installation 14' during times of normal pumping operation. In addition or alternatively, some examples of electrical cable 102 have its other end 106 remain attached to mobile service rig 10 during times of normal pumping operation. In some examples, for sake of convenience, one or more electrical switches and/or junction box(es) are used to help switch the electrical cable's connection between mobile service rig 10 and ESP installation 14'.

Figure 18:
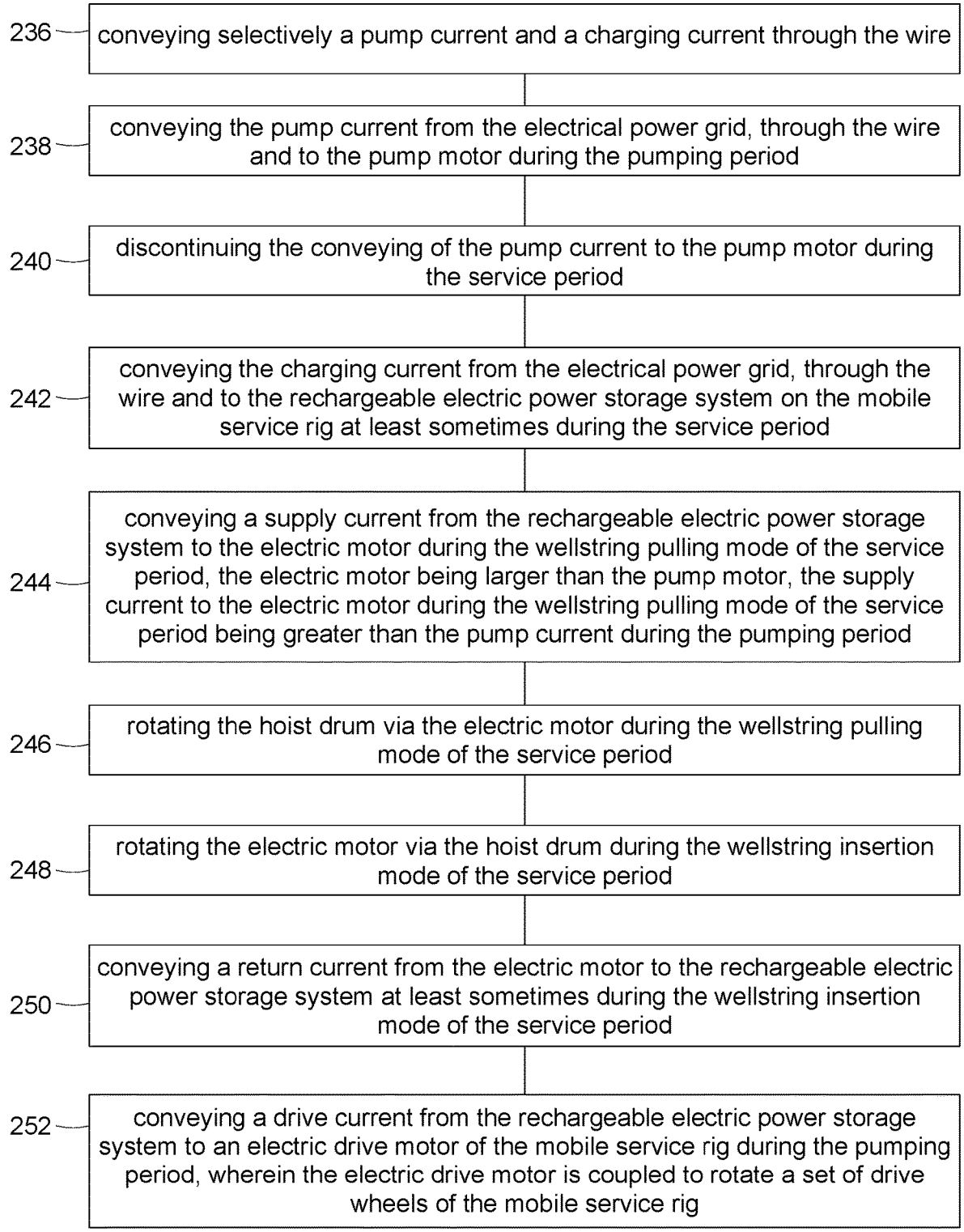
FIG. 18 is a flow diagram similar to FIG. 7 but showing example mobile service rig methods associated with the mobile service rigs shown in FIGS. 1-3.

In the method steps shown in FIG. 18, a block 236 represents conveying selectively a pump current 185' and a charging current 187 through the wire 58.

Block 238 represents conveying the pump current 185' from the electrical power grid 63, through the wire 58 and to the pump motor 204 during the pumping period (FIG. 15).

Block 240 represents discontinuing the conveying of the pump current 185' to the pump motor 204 during the service period (FIG. 16).

Block 242 represents conveying the charging current 187 from the electrical power grid 63, through the wire 58 and to the rechargeable electric power storage system 18 on the mobile service rig 10 at least sometimes during the service period (FIG. 16).

Block 244 represents conveying a supply current 84 from the rechargeable electric power storage system 18 to the electric motor 80 during the wellstring pulling mode (FIG. 9) of the service period, the electric motor 80 being larger than the pump motor 204 with respect to both weight and rated horsepower, the supply current 84 to the electric motor 80 during the wellstring pulling mode (FIG. 9) of the service period (FIG. 16) being greater than the pump current 185' during the pumping period (FIG. 15).

Block 246 represents rotating the hoist drum 60 via the electric motor 80 during the wellstring pulling mode (FIG. 9) of the service period (FIG. 16).

Block 248 represents rotating the electric motor 80 via the hoist drum 60 during the wellstring insertion mode (FIG. 13) of the service period (FIG. 16).

Block 250 represents conveying a return current 86 from the electric motor 80 to the rechargeable electric power storage system 18 at least sometimes during the wellstring insertion mode (FIG. 13) of the service period (FIG. 16).

Block 252 represents conveying a drive current 195 from the rechargeable electric power storage system 18 to an electric drive motor 130 (FIG. 4) of the mobile service rig 10 during the pumping period (FIG. 15), wherein the electric drive motor 130 is coupled to rotate a set of drive wheels 76 of the mobile service rig 10.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A mobile service rig for servicing an ESP installation, the ESP installation comprising a circular area of land, a motor controller, a wellhead on top of a wellbore, and an electric pump assembly disposed within the wellbore; the electric pump assembly being selectively activated and deactivated, the circular area of land being defined by a 200-foot radius from the wellhead, the electric pump assembly receiving electrical energy conveyed from an electrical power grid and through the motor controller when the electric pump assembly is activated to pump a fluid up through the wellbore, the electric pump assembly being inactive when the electric pump assembly is deactivated, the mobile service rig being operable selectively in a travel mode for traveling, a wellstring pulling mode for pulling a wellstring up from within the wellbore, a wellstring insertion mode for lowering the wellstring down into the wellbore, and a setup mode; the mobile service rig comprising:
   a chassis;

a set of wheels connected to the chassis to support the chassis in a traveling motion during the travel mode;
a hoist drum supported by the chassis;
a first electric motor being coupled to rotate the hoist drum at least sometimes during the wellstring pulling mode, the hoist drum being coupled to rotate the first electric motor at least sometimes during the wellstring insertion mode;
a rechargeable electric power storage system supported by the chassis, the rechargeable electric power storage system being connected to deliver electrical energy to the first electric motor during the wellstring pulling mode; and
an electrical cable connecting the rechargeable electric power storage system to the ESP installation during at least one of the setup mode, the wellstring pulling mode, and the wellstring insertion mode; the electrical cable being disconnected from at least one of the ESP installation and the rechargeable electric power storage system during the travel mode; the setup mode being when the electric pump assembly is deactivated while the mobile service rig is within the circular area of land and disconnected from the wellstring in the wellbore.

2. The mobile service rig of claim 1, wherein the rechargeable electric power storage system is connected to the electrical power grid when the rechargeable electric power storage system is connected to at least part of the ESP installation.

3. The mobile service rig of claim 1, further comprising:
an auxiliary electric motor supported by the chassis, the auxiliary electric motor being less than one third the weight of the first electric motor, the auxiliary electric motor being powered by the rechargeable electric power storage system;
a hydraulic pump powered by the auxiliary electric motor; and
a tongs tool with a hydraulic motor powered by the hydraulic pump, the tongs tool being adapted to apply torque to the wellstring.

4. The mobile service rig of claim 3, further comprising:
a mast being pivotal relative to the chassis between a raised position and a lowered position;
a hydraulic cylinder connected to move the mast between the lowered position and the raised position, the hydraulic cylinder being powered by the hydraulic pump, which in turn is powered by the auxiliary electric motor; and
a winch supported by the chassis, the winch being powered by the hydraulic pump, which in turn is powered by the auxiliary electric motor, whereby each of the tongs tool, the hydraulic cylinder and the winch is powered by the auxiliary electric motor, which is at least sometimes energized by the rechargeable electric power storage system.

5. The mobile service rig of claim 1, wherein the first electric motor is connectable selectively to the hoist drum and the set of wheels.

6. The mobile service rig of claim 1, further comprising:
a sand drum supported by the chassis; and
a gearbox connecting the first electric motor selectively to the hoist drum and the sand drum.

7. The mobile service rig of claim 1, further comprising:
a second electric motor being connected to exchange electrical energy with the rechargeable electric power storage battery system; and
a compound gearbox comprising a first input shaft, a second input shaft and an output shaft; the compound gearbox being shiftable selectively to a first configuration, a second configuration and a third configuration; the first electric motor being connected to the first input shaft, the second electric motor being connected to the second input shaft, the hoist drum being coupled to the output shaft, the hoist drum being powered solely by the first electric motor when the compound gearbox is in the first configuration during the wellstring pulling mode, the hoist drum being powered solely by the second electric motor when the compound gearbox is in the second configuration during the wellstring pulling mode, and the hoist drum being powered jointly by the first electric motor and the second electric motor when the compound gearbox is in the third configuration during the wellstring pulling mode.

8. The mobile service rig of claim 7, wherein the first electric motor is of a first rated horsepower, the second electric motor is of a second rated horsepower, and the first rated horsepower is greater than the second rated horsepower.

9. The mobile service rig of claim 1, further comprising an electric drive motor coupled to rotate the set of wheels during the travel mode, the electric drive motor being connected to receive electrical energy from the rechargeable electric power storage system during the travel mode.

10. The mobile service rig of claim 1, wherein the rechargeable electric power storage system is connected to receive electrical energy from the first electric motor at least sometimes during the wellstring insertion mode.

11. A mobile service rig for servicing an ESP installation, the ESP installation comprising a circular area of land, a motor controller, a wellhead on top of a wellbore, and an electric pump assembly disposed within the wellbore; the electric pump assembly being selectively activated and deactivated, the circular area of land being defined by a 200-foot radius from the wellhead, the electric pump assembly receiving electrical energy conveyed from an electrical power grid and through the motor controller when the electric pump assembly is activated to pump a fluid up through the wellbore, the electric pump assembly being inactive when the electric pump assembly is deactivated, the mobile service rig being operable selectively in a travel mode for traveling, a wellstring pulling mode for pulling a wellstring up from within the wellbore, a wellstring insertion mode for lowering the wellstring down into the wellbore, and a setup mode; the mobile service rig comprising:
a chassis;
a set of wheels connected to the chassis to support the chassis in a traveling motion during the travel mode;
a hoist drum supported by the chassis;
a first electric motor;
a gearbox coupling the first electric motor to the hoist drum, the first electric motor being coupled to rotate the hoist drum at least sometimes during the wellstring pulling mode, the hoist drum being coupled to rotate the first electric motor at least sometimes during the wellstring insertion mode;
a rechargeable electric power storage system supported by the chassis, the rechargeable electric power storage system being connected to deliver electrical energy to the first electric motor during the wellstring pulling mode;
an electrical cable connecting the rechargeable electric power storage system to the ESP installation during at least one of the wellstring pulling mode and the wellstring insertion mode, the electrical cable being disconnected from at least one of the ESP installation and the rechargeable electric power storage system during the travel mode;
an auxiliary electric motor supported by the chassis, the auxiliary electric motor being smaller than the first electric motor, the auxiliary electric motor being powered at least sometimes by the rechargeable electric power storage system;
a hydraulic pump powered by the auxiliary electric motor;
a tongs tool with a hydraulic motor powered by the hydraulic pump, the tongs tool being adapted to apply torque to the wellstring;
a mast being pivotal relative to the chassis between a raised position and a lowered position;
a hydraulic cylinder connected to move the mast between the lowered position and the raised position; and
a winch supported by the chassis, each of the tongs tool, the hydraulic cylinder and the winch being powered by the hydraulic pump, which in turn is powered by the auxiliary electric motor, which is at least sometimes energized by the rechargeable electric power storage system.

12. The mobile service rig of claim 11, wherein the rechargeable electric power storage system is connected to the electrical power grid when the rechargeable electric power storage system is connected to the ESP installation.

13. The mobile service rig of claim 11, further comprising:
a second electric motor being connected to exchange electrical energy with the rechargeable battery system; and
a compound gearbox comprising a first input shaft, a second input shaft and an output shaft; the compound gearbox being shiftable selectively to a first configuration, a second configuration and a third configuration; the first electric motor being connected to the first input shaft, the second electric motor being connected to the second input shaft, the hoist drum being coupled to the output shaft, the hoist drum being powered solely by the first electric motor when the compound gearbox is in the first configuration during the wellstring pulling mode, the hoist drum being powered solely by the second electric motor when the compound gearbox is in the second configuration during the wellstring pulling mode, and the hoist drum being powered jointly by the first electric motor and the second electric motor when the compound gearbox is in the third configuration during the wellstring pulling mode.

14. The mobile service rig of claim 13, wherein the first electric motor is of a first rated horsepower, the second electric motor is of a second rated horsepower, and the first rated horsepower is greater than the second rated horsepower.

15. The mobile service rig of claim 11, wherein the rechargeable electric power storage system is connected to receive electrical energy from the first electric motor at least sometimes during the wellstring insertion mode.

16. The mobile service rig of claim 11, wherein the rechargeable electric power storage system is connected to power rotation of the set of wheels during the travel mode.

17. A mobile service rig method for operating a mobile service rig, the mobile service rig method involving the use of at least one of an electrical power grid, a wire, and an ESP installation; the ESP installation comprising a circular area of land, a wellhead on top of a wellbore, an electric pump assembly disposed within the wellbore, and a wellstring connected to the electric pump assembly; the electric pump assembly comprising a pump motor coupled to a submerged pump, the electric pump assembly being selectively activated and deactivated, the circular area of land being defined by a 200-foot radius from the wellhead; the mobile service rig comprising a rechargeable electric power storage system, a hoist drum, and an electric motor coupled to the hoist drum; the mobile service rig method having selectively a pumping period during which the electric pump assembly is activated to pump a fluid up through the wellstring, and a service period during which the electric pump assembly is deactivated, the service period having selectively a wellstring pulling mode in which the mobile service rig lifts the wellstring up from within the wellbore at the ESP installation and a wellstring insertion mode in which the mobile service rig lowers the wellstring down into the wellbore; the mobile service rig method comprising:
conveying selectively a pump current and a charging current through the wire;
conveying the pump current from the electrical power grid, through the wire and to the pump motor during the pumping period;
discontinuing the conveying of the pump current to the pump motor during the service period;
conveying the charging current from the electrical power grid, through the wire and to the rechargeable electric power storage system on the mobile service rig at least sometimes during the service period;
conveying a supply current from the rechargeable electric power storage system to the electric motor during the wellstring pulling mode of the service period, the electric motor being larger than the pump motor, the supply current to the electric motor during the wellstring pulling mode of the service period being greater than the pump current during the pumping period; and
rotating the hoist drum via the electric motor during the wellstring pulling mode of the service period.

18. The mobile service rig method of claim 17, further comprising conveying a drive current from the rechargeable electric power storage system to an electric drive motor of the mobile service rig during the pumping period, wherein the electric drive motor is coupled to rotate a set of wheels of the mobile service rig.

19. The mobile service rig method of claim 17, further comprising:
rotating the electric motor via the hoist drum during the wellstring insertion mode of the service period; and
conveying a return current from the electric motor to the rechargeable electric power storage system at least sometimes during the wellstring insertion mode of the service period.

\* \* \* \* \*